US012601443B2

(12) United States Patent
Ji et al.

(10) Patent No.: US 12,601,443 B2
(45) Date of Patent: Apr. 14, 2026

(54) NATURAL GAS PIPELINES, METHODS FOR FILLING AN EXPLOSION SUPPRESSION COMPONENT, AND METHODS FOR AN EXPLOSION SUPPRESSION EXPERIMENT

(71) Applicant: CHANGZHOU UNIVERSITY, Changzhou (CN)

(72) Inventors: Hong Ji, Changzhou (CN); Ting Wang, Changzhou (CN); Ke Yang, Changzhou (CN); Juncheng Jiang, Changzhou (CN); Zhixiang Xing, Changzhou (CN); Shijie Fan, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 310 days.

(21) Appl. No.: 18/510,614

(22) Filed: Nov. 15, 2023

(65) Prior Publication Data

US 2024/0167609 A1     May 23, 2024

Related U.S. Application Data

(63) Continuation of application No. PCT/CN2023/123287, filed on Oct. 8, 2023.

(30) Foreign Application Priority Data

Nov. 21, 2022     (CN) .......................... 202211452882.6

(51) Int. Cl.
    *F16L 57/04*        (2006.01)
    *F17D 5/00*         (2006.01)
    *G01M 3/28*         (2006.01)
(52) U.S. Cl.
    CPC .............. *F16L 57/04* (2013.01); *F17D 5/005* (2013.01); *G01M 3/2815* (2013.01)

(58) Field of Classification Search
    CPC ....... F16L 57/00; F16L 57/04; F17D 1/00–04; F17D 5/00; F17D 5/005; G01M 3/24–28; G01M 3/2815
    See application file for complete search history.

(56) References Cited

U.S. PATENT DOCUMENTS

2020/0040726 A1     2/2020  Lu et al.
2024/0167609 A1     5/2024  Ji et al.

FOREIGN PATENT DOCUMENTS

CN        103424531  A  * 12/2013  ............. G01N 33/22
CN        106370783  A  *  2/2017  ............. G01N 33/00
        (Continued)

OTHER PUBLICATIONS

Machine Translation of CN-103424531-A (Year: 2013).*
        (Continued)

*Primary Examiner* — Nguyen Q. Ha
(74) *Attorney, Agent, or Firm* — METIS IP LLC

(57) ABSTRACT

The present disclosure provides natural gas pipelines, methods for filling an explosion suppression component, and methods for an explosion suppression experiment. The natural gas pipeline may include a pipeline body and an explosion suppression component. The explosion suppression component may be provided within the pipeline body and may include at least one of a first explosion suppression component and at least one second explosion suppression component. The method may include forming a first explosion suppression component by performing a first process on an explosion suppression material; and forming at least one second explosion suppression component by performing a second process on the explosion suppression material. The first process may include cutting and winding, and the second process may include stacking and cutting seam expansion.

7 Claims, 15 Drawing Sheets

(56) References Cited

FOREIGN PATENT DOCUMENTS

| | | | |
|---|---|---|---|
| CN | 110006949 | A | 7/2019 |
| CN | 110544419 | A | 12/2019 |
| CN | 209839464 | U | 12/2019 |
| CN | 111879818 | A | 11/2020 |
| CN | 114705721 | A | 7/2022 |
| CN | 115050170 | A | 9/2022 |
| KR | 19980011020 | U | 5/1998 |
| KR | 200260543 | Y1 | 1/2002 |
| RU | 2537149 | C1 | 12/2014 |

OTHER PUBLICATIONS

Machine Translation of CN-106370783-A (Year: 2017).*
International Search Report in PCT/CN2023/123287 mailed on Dec. 21, 2023, 8 pages.
Written Opinion in PCT/CN2023/123287 mailed on Dec. 21, 2023, 8 pages.
Xiao, Jijun et al., Experimental Study on the Explosion Suppression Characteristics of Porous Metal in Pipeline Gas Explosion, Technology Innovation and Application, 1: 61-62, 2020.
Yang, Jinjun et al., Experimental Study on Explosion Suppression Property of Honeycombs Aluminum Alloy on Gas Explosion in Linked Vessels, 23(11): 32-36, 2013.
Ru, Chengyou et al., Explosion-Proof Principle and Application of Han Barrier Explosion-Proof Technology, China Science and Technology Information, 2006, 7 pages.
The Second Office Action in Chinese Application No. 202211452882.6 mailed on Jun. 20, 2025, 15 pages.

\* cited by examiner

12

9

<u>200</u>

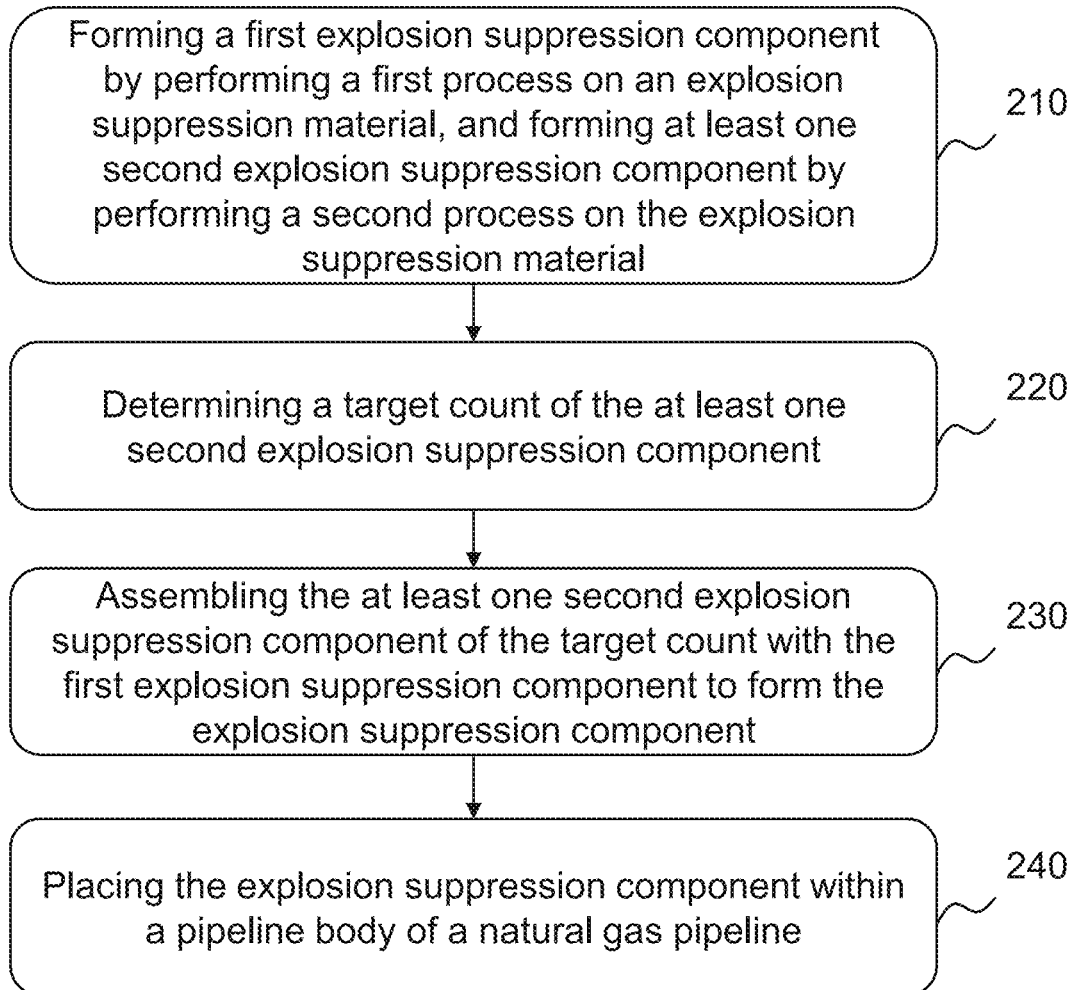

Forming a first explosion suppression component by performing a first process on an explosion suppression material, and forming at least one second explosion suppression component by performing a second process on the explosion suppression material ~ 210

Determining a target count of the at least one second explosion suppression component ~ 220

Assembling the at least one second explosion suppression component of the target count with the first explosion suppression component to form the explosion suppression component ~ 230

Placing the explosion suppression component within a pipeline body of a natural gas pipeline ~ 240

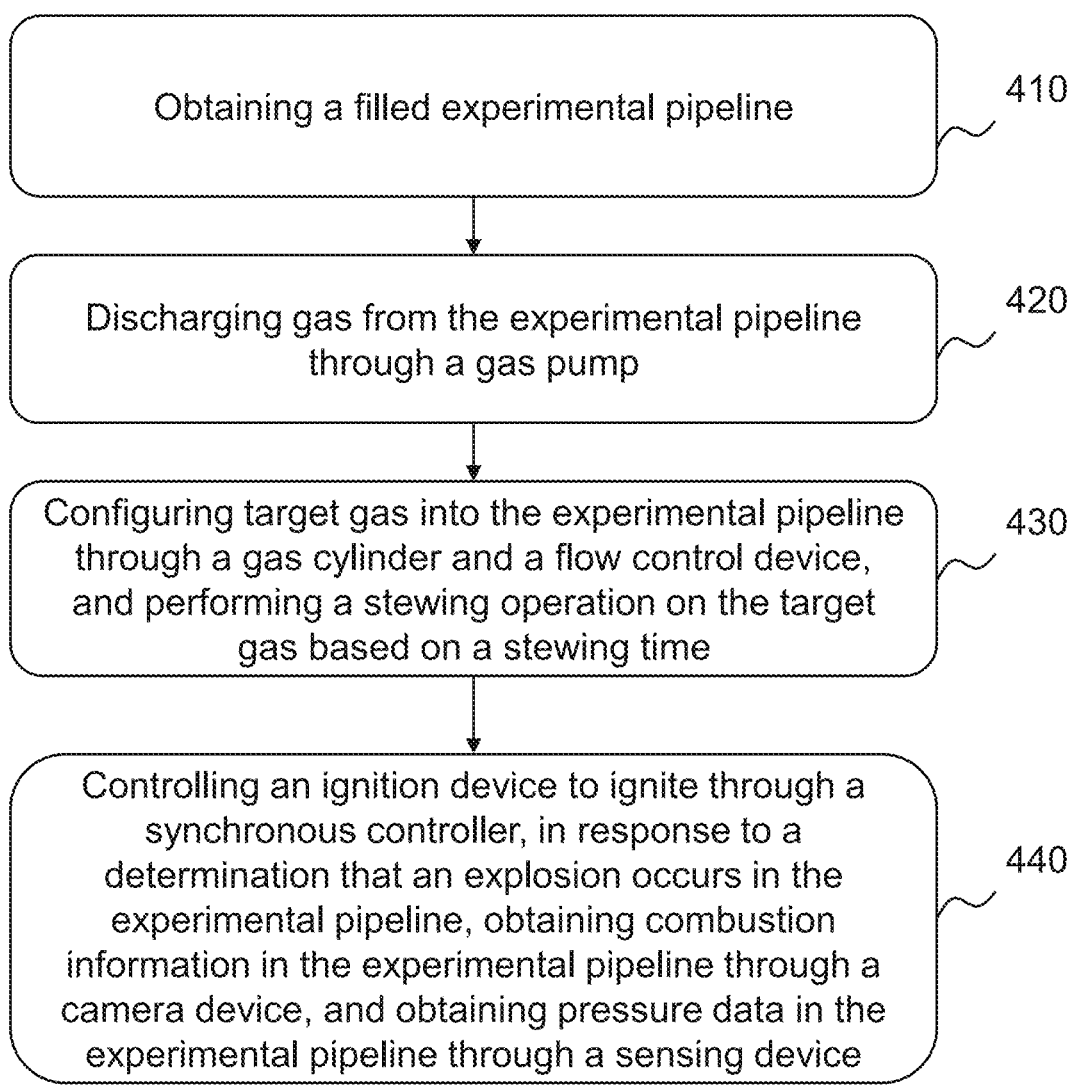

Obtaining a filled experimental pipeline    410

Discharging gas from the experimental pipeline through a gas pump    420

Configuring target gas into the experimental pipeline through a gas cylinder and a flow control device, and performing a stewing operation on the target gas based on a stewing time    430

Controlling an ignition device to ignite through a synchronous controller, in response to a determination that an explosion occurs in the experimental pipeline, obtaining combustion information in the experimental pipeline through a camera device, and obtaining pressure data in the experimental pipeline through a sensing device    440

NATURAL GAS PIPELINES, METHODS FOR FILLING AN EXPLOSION SUPPRESSION COMPONENT, AND METHODS FOR AN EXPLOSION SUPPRESSION EXPERIMENT

CROSS-REFERENCE TO RELATED APPLICATIONS

This application is a Continuation of International Application No. PCT/CN2023/123287, filed on Oct. 8, 2023, which claims priority to Chinese Patent Application No. 202211452882.6, filed on Nov. 21, 2022, the entire contents of each of which are hereby incorporated by reference.

TECHNICAL FIELD

The present disclosure relates to the field of natural gas technology, and in particular, to a natural gas pipeline, a method for filling an explosion suppression component, and a method for an explosion suppression experiment.

BACKGROUND

Pipeline technology is mostly used for storing or transporting flammable liquids such as gasoline or diesel, or natural gas. Due to the risk of flammability and explosiveness of the contents, pipelines for transportation need to be safely reinforced with a special barrier and explosion suppression material to mitigate casualties and property damage caused by an accidental explosion. The barrier and explosion suppression material is commonly made of an aluminum alloy foil with a honeycomb structure. The honeycomb structure of the aluminum alloy foil may resist the release of instantaneous energy at the moment of explosion, absorb the high temperature generated by the explosion, and quickly dissipate heat outward, and prevent the spread and expansion of the flame, thereby ensuring the safety of storage and transportation.

Countermeasures for the natural gas pipeline explosion suppression are mainly considered from physical or chemical aspects. Physical suppression is achieved by spraying ultra-fine water mist, or explosion suppression is achieved by highly atomizing liquid and gas using a dual-fluid technology. From the chemical aspect, it is more inclined to powder explosion suppression. That is, a chemical reaction is caused by spraying explosion suppression powder to absorb heat. However, both the water mist and powder may not be completely controlled to quickly suppress the explosion.

Therefore, it is desirable to provide a natural gas pipeline, a method for filling an explosion suppression component, and a method for an explosion suppression experiment to accurately suppress explosions and reduce the accident rate, thereby ensuring transportation safety.

SUMMARY

One or more embodiments of the present disclosure provide a natural gas pipeline. The natural gas pipeline may include a pipeline body and an explosion suppression component. The explosion suppression component may be provided within the pipeline body, and the explosion suppression component may include at least one of a first explosion suppression component and at least one second explosion suppression component. The first explosion suppression component may be arranged on an inner peripheral wall of the pipeline body along an axial direction of the pipeline body to form an explosion suppression channel. The at least one second explosion suppression component may be arranged at an interval along an axial direction of the explosion suppression channel, and the at least one second explosion suppression component may include at least one second explosion suppression sub-component.

One or more embodiments of the present disclosure provide a method for filling an explosion suppression component. The method may be configured to implement the natural gas pipeline. The method may be implemented by a device for filling the explosion suppression component. The method may include forming a first explosion suppression component by performing a first process on an explosion suppression material and forming at least one second explosion suppression component by performing a second process on the explosion suppression material. The first explosion suppression component and the at least one second explosion suppression component may include a porous hexagonal structure. The first process may include cutting and winding, and the second process may include stacking and cutting seam expansion. The method may further include determining a target count of the at least one second explosion suppression component. The method may further include assembling the at least one second explosion suppression component of the target count with the first explosion suppression component to form the explosion suppression component. The method may further include placing the explosion suppression component within the pipeline body of the natural gas pipeline.

One or more embodiments of the present disclosure provide a method for an explosion suppression experiment. The method may be implemented through an experimental device. The method may include obtaining a filled experimental pipeline. The method may further include discharging gas from the experimental pipeline through a gas pump. The method may further include configuring target gas into the experimental pipeline through a gas cylinder and a flow control device and performing a stewing operation on the target gas based on a stewing time. The method may further include controlling an ignition device to ignite through a synchronous controller, in response to a determination that an explosion occurs in the experimental pipeline, obtaining combustion information in the experimental pipeline through a camera device, and obtaining pressure data in the experimental pipeline through a sensing device.

BRIEF DESCRIPTION OF THE DRAWINGS

The present disclosure is further illustrated in terms of exemplary embodiments. These exemplary embodiments are described in detail according to the drawings. These embodiments are non-limiting exemplary embodiments, in which like reference numerals represent similar structures, wherein:

FIG. 2 is a flowchart illustrating an exemplary process for filling an explosion suppression component according to some embodiments of the present disclosure;

FIG. 4 is a flowchart illustrating an exemplary process for an explosion suppression experiment according to some embodiments of the present disclosure;

DETAILED DESCRIPTION

Figure 1:
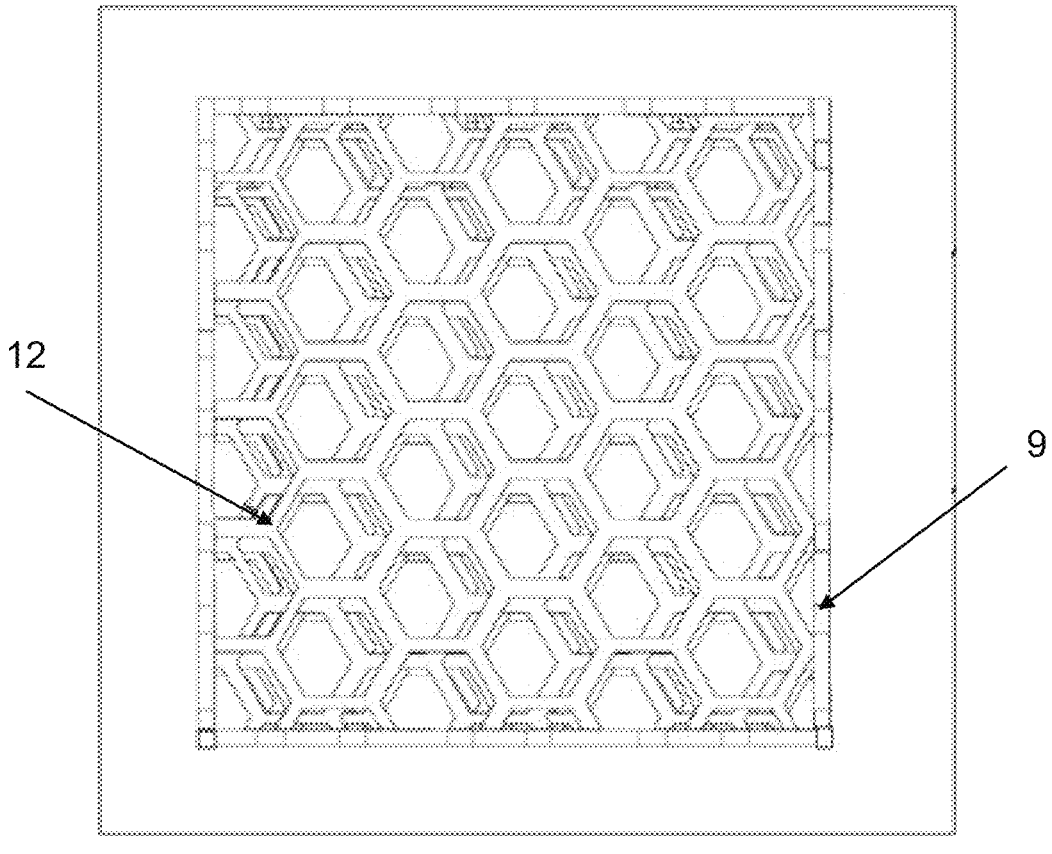
FIG. 1 is a schematic diagram illustrating an exemplary structure of a natural gas pipeline according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

Figure 10:
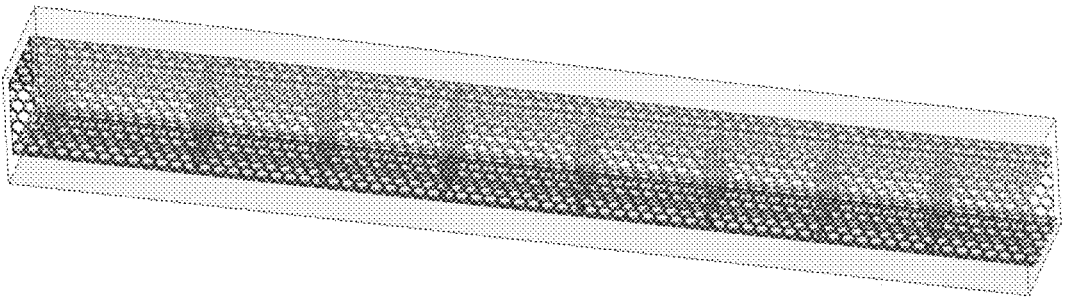
FIG. 10 is a schematic diagram illustrating another exemplary structure of a natural gas pipeline according to some embodiments of the present disclosure.
Figure 11:
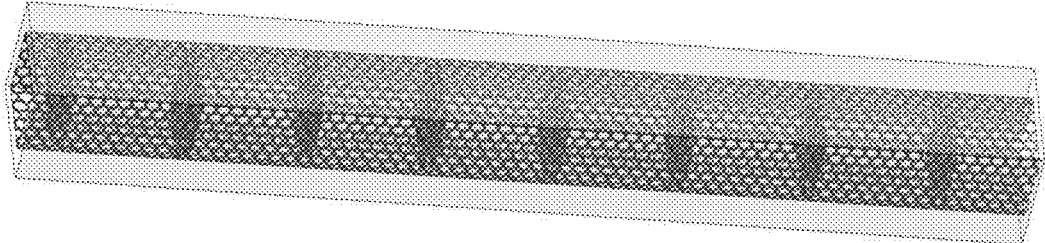
FIG. 11 is a schematic diagram illustrating yet another exemplary structure of a natural gas pipeline according to some embodiments of the present disclosure.

FIG. 1 is a schematic diagram illustrating an exemplary structure of a natural gas pipeline according to some embodiments of the present disclosure. FIG. 10 is a schematic diagram illustrating another exemplary structure of a natural gas pipeline according to some embodiments of the present disclosure. FIG. 11 is a schematic diagram illustrating yet another exemplary structure of a natural gas pipeline according to some embodiments of the present disclosure. As shown in FIGS. 1, 10, and 11, the natural gas pipeline may include a pipeline body and an explosion suppression component.

Figure 8:
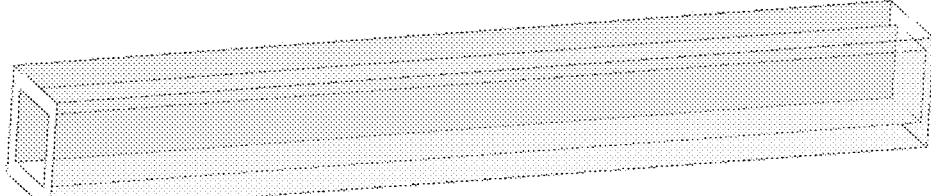
FIG. 8 is a schematic diagram illustrating an exemplary structure of a pipeline body according to some embodiments of the present disclosure.

FIG. 8 is a schematic diagram illustrating an exemplary structure of a pipeline body according to some embodiments of the present disclosure. As shown in FIG. 8, the pipeline body refers to a structure through with a substance (e.g., a gas, a liquid, a solid particle, or other fluid) may pass. In some embodiments, the pipeline body may be in a plurality of shapes (e.g., a straight shape, a curved shape, or a bent shape). In some embodiments, a hollow channel may be formed inside the pipeline body. In some embodiments, an outer contour of a cross-section of the pipeline body may be in a plurality of shapes (e.g., a circle, an oval, or a polygon). In some embodiments, an outer contour of a cross-section of the channel may be similar to the outer contour of the cross-section of the pipeline body.

In some embodiments, the pipeline body may include a metallic material and/or a non-metallic material. The metallic material may be an alloy material of X60 steel, an alloy material of X65 steel, an alloy material of X70 steel, or the like, or any combination thereof. The metallic material may be used to make a pipeline-like structure that serves as a main body of the pipeline body. The non-metallic material may be resin, rubber, an organic material, an inorganic material, or the like, or any combination thereof. The non-metallic material may be used to make a protective structure against corrosion, abrasion, water, and/or dust to protect the main body made of the metallic material.

The explosion suppression component refers to a structure that suppresses an explosion. The explosion suppression component may suppress the explosion in a plurality of ways, such as blocking an explosion propagation path, absorbing and/or dispersing explosion energy, reducing explosive concentration, etc. In some embodiments, the explosion suppression component may be provided within the pipeline body. When the explosion occurs in the pipeline body, the explosion suppression component may suppress the explosion in the pipeline body, thereby protecting the pipeline body, reducing or avoiding damage received by the pipeline body, and reducing the hazards generated by the explosion.

In some embodiments, the explosion suppression component may include at least one of a first explosion suppression component 9 and at least one second explosion suppression component 12. In some embodiments, the first explosion suppression component 9 may be arranged on an inner peripheral wall of the pipeline body along an axial direction of the pipeline body to form an explosion suppression channel. In some embodiments, the second explosion suppression components 12 may be arranged at an interval along an axial direction of the explosion suppression channel.

Figure 9:
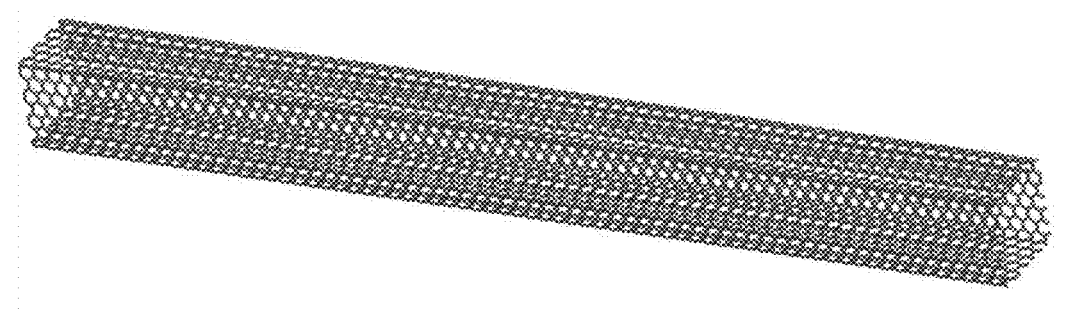
FIG. 9 is a schematic diagram illustrating an exemplary structure of a first explosion suppression component according to some embodiments of the present disclosure.

FIG. 9 is a schematic diagram illustrating an exemplary structure of a first explosion suppression component according to some embodiments of the present disclosure. The first explosion suppression component 9 may be configured to minimize, suppress, or avoid the effects of an explosion on an inner wall of a pipeline body. For example, the first explosion suppression component 9 may block a path where the explosion is transmitted to the inner wall of the pipeline body, absorb and/or disperse explosion energy transmitted to the inner wall of the pipeline body, reduce explosive concentration, etc. In some embodiments, the first explosion suppression component 9 may reduce, suppress, or avoid the effects of the explosion on the inner wall of the pipeline body in a plurality of ways. In some embodiments, the first explosion suppression component 9 may be covered on the inner wall of the pipeline body to block the path where the explosion is transmitted to the inner wall of the pipeline body.

In some embodiments, the first explosion suppression component 9 may be in a plurality of shapes (e.g., a cylinder or a rectangular). In some embodiments, the first explosion suppression component 9 may be a hollow shape that matches the pipeline body, and an outer contour of a cross-section of the first explosion suppression component 9 may match an inner contour of a cross-section of the pipeline body.

In some embodiments, the first explosion suppression component 9 may include a cushioning-dampening structure for absorbing and/or dispersing explosion energy transmitted to the inner wall of the pipeline body. The cushioning-dampening structure may include an elastic structure and/or an elastic material. The elastic structure may include a flat plate-like structure, a bent plate-like structure, a spring, a spring plate, or the like, or any combination thereof. The elastic material may include aluminum alloy, rubber, or the like, or any combination thereof.

In some embodiments, the first explosion suppression component 9 may include a thermally conductive structure and/or a thermally conductive material for absorbing thermal energy generated by the explosion energy. The thermally conductive structure may be a plate-like structure, a laminate structure, etc., made of the thermally conductive material. The thermally conductive material may include copper, aluminum, zinc, graphite, aluminum nitride, silicon carbide, or the like, or any combination thereof. In some embodiments, the first explosion suppression component 9 may also include other structures and/or materials having high strength, high abrasion resistance, and/or high corrosion resistance, etc.

Figure 7:
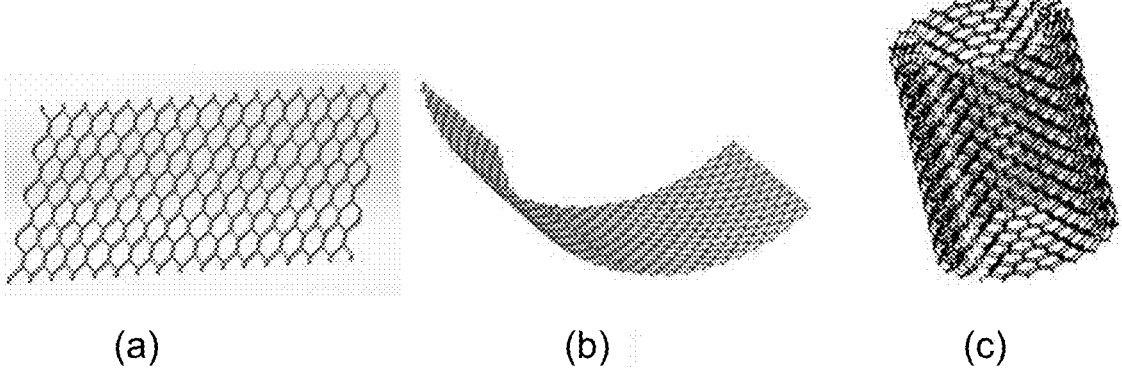
FIG. 7 is a schematic diagram illustrating an exemplary structure of an explosion suppression material according to some embodiments of the present disclosure.

In some embodiments, the first explosion suppression component 9 may be made of an explosion suppression material. FIG. 7 is a schematic diagram illustrating an exemplary structure of an explosion suppression material according to some embodiments of the present disclosure. The explosion suppression material refers to a material that is capable of reducing or suppressing an explosion impact. The explosion suppression material may include a metallic material (e.g., an aluminum alloy foil), etc. In some embodiments, the explosion suppression material may include a porous hexagonal structure. The porous hexagonal structure refers to a honeycomb structure formed by a plurality of hexagonal cells.

It should be understood that the honeycomb structure refers to a structure formed by a plurality of grid cells connected to each other and arranged in an arrangement and the grid cells may include a circle, an oval, a triangle, a polygon, or the like, or any combination thereof. In some embodiments, a side length of each of the grid cells may be in a range of 3 mm-8 mm, such as 4 mm±0.5 mm, 5 mm±0.5 mm, 5.5 mm±0.5 mm, 6 mm±0.5 mm, 7 mm±0.5 mm, etc.

In some embodiments of the present disclosure, the explosion suppression material may include the porous hexagonal structure, which may make the explosion suppression material have good strength and cushioning capacity and may absorb a portion of the energy in the explosion impact, thereby weakening the explosion impact.

In some embodiments, as shown in FIGS. 7 and 9, the first explosion suppression component 9 may be made by winding the aluminum alloy foil to form an explosion suppression channel, and the explosion suppression channel may be covered on the inner wall of the pipeline body. In some embodiments, the explosion suppression channel may abut against the inner wall of the pipeline body, or the explosion suppression channel may be connected to the inner wall of the pipeline body in other ways. For example, the connection way may include bonding, welding, threaded connection, snapping, magnetic suction, or the like, or any combination thereof. In some embodiments, the first explosion suppression component 9 and at least one explosion suppression sub-component may include a porous hexagonal structure.

The second explosion suppression component may be configured to minimize, suppress, or avoid the effects of an explosion along the axial direction of the pipeline body. It should be understood that most of the explosion impact generated in the pipeline body may be transmitted along the axial direction of the pipeline body, and the second explosion suppression component(s) 12 may be arranged at an interval along an axial direction of the explosion suppression channel, which may effectively reduce the impact generated by the explosion. In some embodiments, the second explosion suppression component(s) 12 may be in a plurality of shapes (e.g., a rectangular solid or a multi-layered sheet).

In some embodiments, the second explosion suppression component(s) 12 may include at least one second explosion suppression sub-component. The second explosion suppression sub-component(s) refers to a subordinate component that constitutes the second explosion suppression component(s). For example, when the second explosion suppression component(s) 12 is a multi-layered sheet component, the second explosion suppression sub-component(s) may be a single-layered sheet component of the second explosion suppression component(s) 12.

It should be understood that natural gas in the pipeline body may pass through the second explosion suppression sub-component(s). When the explosion occurs in the pipeline body, the first explosion suppression component 9 may weaken a portion of the explosion impact directed toward a side wall of the pipeline body, thereby reducing or avoiding the impact on the side wall of the pipeline body. The second explosion suppression sub-component(s) may partially block the explosion impact along the axial direction of the pipeline body, and the multi-layered second explosion suppression sub-component(s) may gradually weaken the explosion impact along the axial direction of the pipeline body.

In some embodiments, the second explosion suppression components 12 may be arranged at an equal interval along the axial direction of the explosion suppression channel, which should be understood that the second explosion suppression components 12 may be uniformly distributed in the explosion suppression channel, and an explosion suppression unit region may be formed in a region between two second explosion suppression components 12. Explosion suppression capacities of a plurality of explosion suppression unit regions are the same, thereby avoiding weak explosion suppression capacity in local regions due to an uneven distribution of the second explosion suppression components 12.

In some embodiments, the second explosion suppression component(s) 12 may be fixedly connected to the first explosion suppression component 9 in a plurality of ways, which improves the overall strength of the explosion suppression component and avoids the weakening of explosion suppression capacity in the local regions of the explosion suppression channel caused by displacement of the second explosion suppression component(s) 12. For example, the second explosion suppression component(s) 12 and the first explosion suppression component 9 may be connected through bonding, welding, threaded connection, snapping, or the like, or any combination thereof.

In some embodiments, the second explosion suppression sub-components may also be made of the explosion suppression material. More descriptions regarding the explosion suppression material may be found in related descriptions hereinabove.

In some embodiments, the second explosion suppression sub-components may be arranged in the explosion suppression channel along a radial direction of the explosion suppression channel. The second explosion suppression sub-components may be arranged in the explosion suppression channel along the radial direction of the explosion suppression channel, which may reduce the area occupied by the second explosion suppression sub-components and facilitate the installation of the second explosion suppression sub-components.

In some embodiments, the second explosion suppression sub-components may be arranged in the explosion suppression channel at a radial inclination relative to the explosion suppression channel. For example, an inclination angle of each of the second explosion suppression sub-components relative to the radial direction of the explosion suppression channel may be 30°, 45°, 60°, etc. The second explosion suppression sub-components may be arranged in the explosion suppression channel at the radial inclination, which may increase the area occupied by the second explosion suppression sub-components. Therefore, when an explosion occurs, the second explosion suppression sub-components may absorb more explosion impact, which may reduce the scope of the explosion impact.

Figure 12:
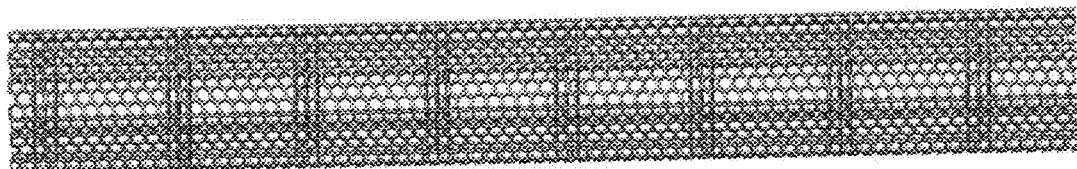
FIG. 12 is a schematic diagram illustrating an exemplary structure of an explosion suppression component according to some embodiments of the present disclosure.
Figure 13:
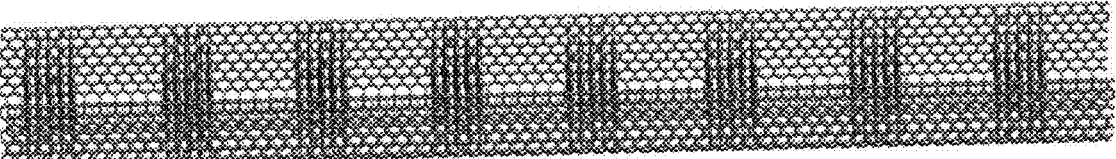
FIG. 13 is a schematic diagram illustrating another exemplary structure of an explosion suppression component according to some embodiments of the present disclosure.

In some embodiments, as shown in FIGS. 12 and 13, the second explosion suppression component(s) 12 may include at least three second explosion suppression sub-components, and the at least three second explosion suppression components may be arranged at an equal interval. By arranging the at least three second explosion suppression sub-components, the explosion impact may be weakened a plurality of times when the explosion impact passes through single second explosion suppression component 12, thereby enhancing the explosion suppression capability of the single second explosion suppression component 12.

In some embodiments, a distance between two adjacent second explosion sub-suppression components may be smaller than a distance between two adjacent second explosion suppression components 12, which may avoid affecting the normal transportation of natural gas and due to the relatively small distances of a plurality of second explosion suppression sub-components and may also reduce the cost of use.

In some embodiments, adjacent second explosion suppression sub-components of the second explosion suppression sion sub-components may be provided in a mutual dislocation arrangement. The dislocation arrangement refers to that hexagonal cells on the adjacent second explosion suppression sub-components are staggered from each other in the radial direction of the explosion suppression channel. For example, in the axial direction of the explosion suppression channel, centers of the hexagonal cells of a previous second explosion suppression sub-component may be in a same line as vertices of the hexagonal cells of a subsequent second explosion suppression sub-component. As another example, in the axial direction of the explosion suppression channel, vertices of the hexagonal cells of the previous second explosion suppression sub-component may be in a same line as the vertices of the hexagonal cells of the subsequent second explosion suppression sub-component, and two second explosion suppression sub-components and sides of the two second explosion suppression sub-components corresponding to the vertices may be staggered at a certain angle.

When the explosion occurs, the explosion impact may pass through the plurality of second explosion suppression sub-components in sequence. When the explosion impact passes through the foremost second explosion suppression sub-component, a portion of the explosion impact is absorbed by edges of the hexagonal cell, and a portion of the explosion impact passes through a middle of the hexagonal cell. The portion of the explosion impact that passes through may be attenuated by contacting with edges of a subsequent hexagonal cell. In this way, the explosion suppression capability of the plurality of second explosion suppression sub-components may be enhanced.

In some embodiments, a dislocation angle may be determined based on a target count of the second explosion suppression components 12. The dislocation angle refers to an angle at which the different components are provided in a dislocation arrangement. The dislocation angle of adjacent second explosion suppression sub-components may be an angle between a line connecting the center of the hexagonal cell of the previous second explosion suppression component and a center of a closest hexagonal cell of the subsequent second explosion suppression component and an axis of the explosion suppression channel. The target count may be a count of the second explosion suppression components 12. In some embodiments, the dislocation angle may be positively correlated with the target count of the second explosion suppression components 12. More descriptions regarding the dislocation angle and the target count may be found in FIG. 3 and related descriptions thereof.

In some embodiments, the second explosion suppression sub-components may be formed by a second process, and the second process may include stacking and cutting seam expansion. The stacking and cutting seam expansion refers to stacking a plurality of layers of material together and cutting the material under pressure to form a desired shape. For example, a plurality of layers of honeycomb aluminum alloy foil may be stacked together and cut under a pressurized state to form a cylinder, a sphere, a square, a cuboid, or the like, or any combination thereof.

By arranging the first explosion suppression component and the second explosion suppression components, it is possible to suppress the explosion from the radial direction and axial direction of the pipeline body, respectively, when the explosion occurs in the pipeline body, which attenuates or avoids the explosion impact on the side wall of the pipeline body. At the same time, the explosion impact is gradually weakened in the process of transmission along the axial direction, and the explosion impact and the scope of the explosion impact are reduced.

FIG. 2 is a flowchart illustrating an exemplary process for filling an explosion suppression component according to some embodiments of the present disclosure. As shown in FIG. 2, the process 200 includes the following operations. In some embodiments, the process 200 may be performed by a device for filling an explosion suppression component.

The device for filling the explosion suppression component refers to a device for implementing a method for filling an explosion suppression component. In some embodiments, the device for filling the explosion suppression component may include at least one processor and at least one storage. The at least one storage may be configured to store computer instructions, and the at least one processor may be configured to execute at least a portion of the computer instructions to implement the method for filling an explosion suppression component.

The storage may be configured to store data and/or instructions. The storage may include one or more storage components. Each of the one or more storage components may be an independent device or may be a portion of another device. In some embodiments, the storage may include a random access memory (RAM), a read-only memory (ROM), a mass storage, a removable storage, a volatile read/write storage, or the like, or any combination thereof.

The processor may process data and/or information obtained from other devices or system components. The processor may execute program instructions based on the data, information, and/or processing results to perform one or more functions described herein.

In 210, forming a first explosion suppression component by performing a first process on an explosion suppression material, and forming at least one second explosion suppression component by performing a second process on the explosion suppression material.

In some embodiments, the first explosion suppression component and the second explosion suppression components include a porous hexagonal structure. More descriptions regarding the explosion suppression material, the first explosion suppression component, the second explosion suppression components, and the porous hexagonal structure may be found in FIG. 1 and related descriptions thereof.

In some embodiments, the first process may include performing an operation of cutting and winding on the explosion suppression material. For example, the explosion suppression material may be cut based on a predetermined size, and wound to form the first explosion suppression component in a form of a hollow cylinder.

In some embodiments, the second process may include performing an operation of stacking and cutting seam expansion on the explosion suppression material. For example, a plurality of sheets of the explosion suppression material may be stacked and cut based on a predetermined size to form a multi-layered sheet of the second explosion suppression component.

In 220, determining a target count of the at least one second explosion suppression component.

The target count refers to a count of the second explosion suppression components determined for assembling the explosion suppression component.

In some embodiments, the processor may determine the target count in a plurality of ways. For example, the processor may determine the target count by obtaining information input by a user. As another example, the processor may determine the target count based on historical data. Merely by way of example, the processor may designate an average value of historical counts of the second explosion suppression components used in assembling a historical pipeline whose length is the same as a length of a current pipeline in the historical data as the target count.

In some embodiments, the processor may also obtain pipeline information and a candidate count of the second explosion suppression components, determine a maximum explosion pressure through an explosion-proof model, and determine the target count. More descriptions regarding determining the maximum explosion pressure and determining the target count based on the explosion-proof model may be found in FIG. 3 and related descriptions thereof.

In 230, assembling the at least one second explosion suppression component of the target count with the first explosion suppression component to form the explosion suppression component.

In some embodiments, the processor may combine the explosion suppression component by arranging the second explosion suppression components at an interval in the explosion suppression channel along a radial direction of the explosion suppression channel based on an interval distance. The interval distance may be set based on experience or needs. More descriptions regarding the explosion suppression channel may be found in FIG. 1 and related descriptions thereof.

In 240, placing the explosion suppression component within a pipeline body of the natural gas pipeline.

In some embodiments, the processor may extend and advance the assembled explosion suppression component from one end of the pipeline body of the natural gas pipeline until the explosion suppression component is placed within the pipeline body of the natural gas pipeline.

In some embodiments of the present disclosure, the safe reinforcement of the natural gas pipeline is completed by treating, assembling, and placing the explosion suppression material, and the first explosion suppression component and the second explosion suppression component are placed in combination, which improves the safety of the pipeline transportation.

Figure 3:
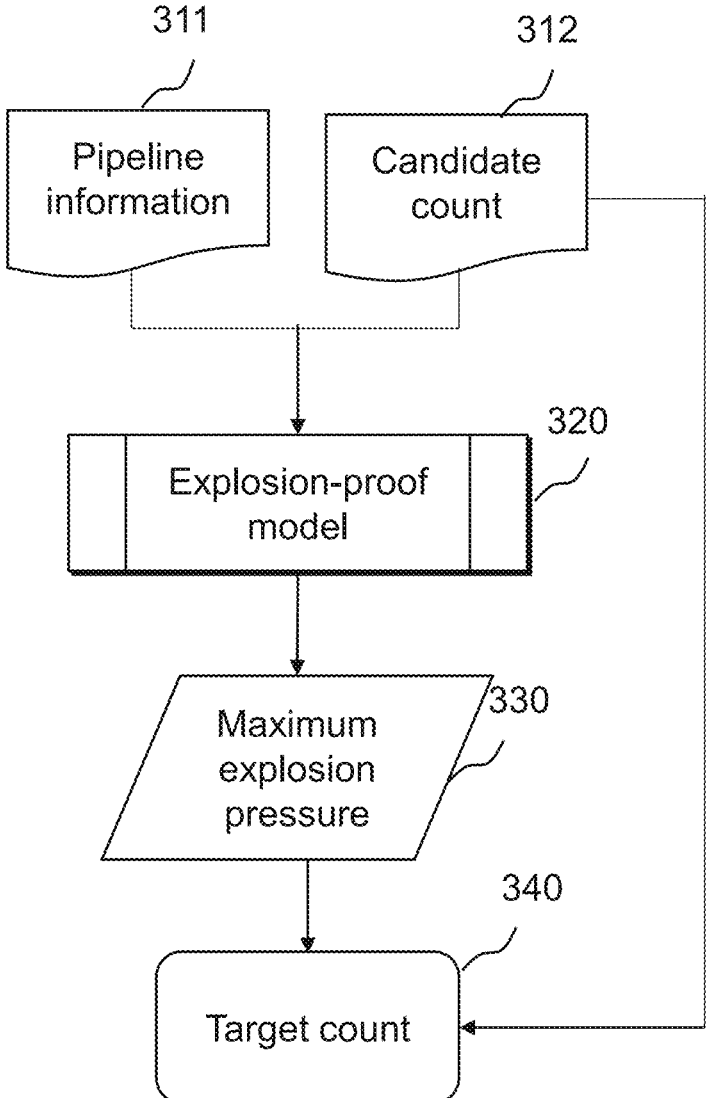
FIG. 3 is a schematic diagram illustrating an exemplary explosion-proof model according to some embodiments of the present disclosure.

FIG. 3 is a schematic diagram illustrating an exemplary explosion-proof model according to some embodiments of the present disclosure.

In some embodiments, the processor may obtain pipeline information 311 and a candidate count 312 of the second explosion suppression components, determine a maximum explosion pressure 330 through the explosion-proof model 320 based on the pipeline information 311 and the candidate count 312 and determine a target count 340 based on the maximum explosion pressure 330 and the candidate count 312. In some embodiments, the explosion-proof model 320 may be a machine learning model.

The pipeline information 311 refers to characteristic information related to a pipeline. The pipeline information 311 may include a pipeline size, a transportation substance, a pipeline material, etc. For example, the pipeline information may be a natural gas pipeline made of cement with an inner diameter of a meters, an outer diameter of b meters, and a length of 10 meters.

In some embodiments, the processor may obtain the pipeline information 311 in a plurality of ways. For example, the processor may obtain the pipeline information by obtaining information input by a user. As another example, the processor may obtain the pipeline information through a storage device inside or outside of a device for filling an explosion suppression component.

The candidate count 312 refers to a count of optional second explosion suppression components. The candidate count 312 may be determined in a plurality of ways. For example, the processor may randomly generate the candidate count of the second explosion suppression components based on a historical count of the second explosion suppression components in historical data.

The maximum explosion pressure 330 refers to a maximum explosion pressure sustained within the pipeline when an explosion occurs. It should be understood that a pressure tolerance threshold may be provided for the natural gas pipeline (i.e., a maximum pressure threshold that the pipeline may withstand), and when the maximum explosion pressure inside the pipeline is greater than the pressure tolerance threshold, the pipeline may be broken, fractured, etc. The pressure tolerance threshold may be predetermined based on experiments, pipeline parameters, etc.

In some embodiments, the processor may determine the maximum explosion pressure 330 based on the pipeline information 311 and the candidate count 312 through the explosion-proof model 320. The explosion-proof model 320 refers to a model for determining the maximum explosion pressure corresponding to the natural gas pipeline. In some embodiments, the explosion-proof model 320 may be a machine learning model, such as a neural network (NN) model, etc.

In some embodiments, an input of the explosion-proof model may include the pipeline information 311 and the candidate count 312, and an output of the explosion-proof model may be the maximum explosion pressure 330. More description regarding the pipeline information, the candidate count, and the maximum explosion pressure may be found in related descriptions hereinabove.

In some embodiments, the explosion-proof model 320 may be obtained by training a plurality of first training samples with first labels. The first training sample(s) may include sample pipeline information and a sample candidate count of sample pipelines, and the first label(s) may include actual maximum explosion pressures corresponding to the sample pipelines. The first training sample(s) may be obtained based on historical data, and the first label(s) may be determined by manual labeling.

In some embodiments, the processor may conduct an explosion suppression experiment on the sample pipelines through a method for an explosion suppression experiment based on the sample pipeline information and the sample candidate count of the sample pipelines, and determine the maximum explosion pressures as the first labels based on pressure data at the time of the explosion of the sample pipelines obtained in the explosion suppression experiment. More descriptions regarding the method for the explosion suppression experiment, and obtaining the pressure data may be found in FIG. 4 and related descriptions thereof.

In some embodiments, the processor may determine the target count 340 based on the maximum explosion pressure 330 and the candidate count 312 in a plurality of ways. For example, the processor may use a candidate count when the maximum explosion pressure is smaller than the pressure tolerance threshold, the difference between the maximum explosion pressure and the pressure tolerance threshold is within a predetermined magnitude, and a value of the candidate count is the largest as the target count of the second explosion suppression components. The predetermined magnitude may be set based on experience or needs.

In some embodiments, the processor may determine an installation distance of the second explosion suppression components based on the pipeline information and the target count. For example, the processor may use a ratio of a pipeline length to the target count in the pipeline information (It should be understood that the second explosion suppression components are arranged at an equal interval) as the installation distance of the second explosion suppression components.

It should be understood that in the actual use of the natural gas pipeline, due to differences in factors such as pipeline materials, pipeline sizes, etc., there may be large differences in the explosion pressure and destructiveness of the explosion. The samples and labels required for model training may be obtained based on experimental data, so that a more realistic and accurate explosion-proof model may be obtained. The pipeline information and the candidate count of the second explosion suppression components may be obtained, the maximum explosion pressure may be determined based on the explosion-proof model, and the target count may be determined, so that data such as the pipeline parameters may be analyzed, a plurality of factors may be comprehensively considered, and an accurate maximum explosion pressure may be obtained, thereby determining a reasonable target count of the second explosion suppression components and facilitating the subsequent assembly of the natural gas pipeline.

In some embodiments, when assembling the second explosion suppression components of the target count with the first explosion suppression component, the processor may determine a dislocation angle between different second explosion suppression components and provide the second explosion suppression components of the target count in a mutual dislocation arrangement. The dislocation angle between the different second explosion suppression components may be different.

It should be understood that the second explosion suppression components may be arranged at an interval in parallel or may be arranged at an interval based on the dislocation angle. In some embodiments, the dislocation may include translational dislocation and rotational dislocation. The dislocation angle between the second explosion suppression components refers to an angle at which positions of the different second explosion suppression components are dislocated when the second explosion suppression components are provided.

In some embodiments, the dislocation angle may be determined based on the target count of the second explosion suppression components. For example, the dislocation angle may be a ratio of 360° to the target count of the second explosion suppression components. It should be understood that the dislocation angle herein is determined based on 360°. That is, after all the second explosion suppression components are installed, an overall dislocation angle (i.e., a rotation angle between a first second explosion suppression component and a last second explosion suppression component) is 360°. In the actual installation process, if other values of the overall dislocation angle (e.g., 720° or 540°) are needed, a product of the previous dislocation angle determined based on 360° and a corresponding ratio value (e.g., the corresponding ratio value of 720° is 2 times that of 360°, the corresponding ratio value of 540° is 1.5 times that of 360°, etc.) of the required overall dislocation angle as the dislocation angle in the actual installation.

In some embodiments, the processor may also determine the dislocation angle through the explosion-proof model. In some embodiments, an input of the explosion-proof model may also include a predetermined dislocation angle. Accordingly, when model training is performed, the first training samples may also include sample predetermined dislocation angles of the sample pipelines. When the first labels through the explosion suppression experiment are obtained, a plurality of groups of second explosion suppression components need to be provided within the pipeline according to the corresponding sample predetermined dislocation angles.

The predetermined dislocation angle may be obtained based on experience or demand presets. More descriptions regarding the input, output, training, and labels of the explosion-proof model may be found in related descriptions hereinabove.

In some embodiments, the processor may also place the plurality of groups of second explosion suppression components at the dislocation angle within the pipeline body of the natural gas pipeline.

In some embodiments, the second explosion suppression components may be rotationally placed within an explosion suppression channel at the dislocation angle.

In some embodiments of the present disclosure, the second explosion suppression components are respectively arranged according to a certain dislocation angle, so that a relatively good explosion-proof performance may be obtained. Additionally, different dislocation angles of installation may lead to different impacts on the explosion-proof performance of a barrier and explosion suppression material. Data of the samples and the labels related to the dislocation angle of the model training may be obtained based on experimental data through the explosion-proof model, which may greatly reduce the cost of labor and time of building and training the model while obtaining the reasonable dislocation angle.

FIG. 4 is a flowchart illustrating an exemplary process for an explosion suppression experiment according to some embodiments of the present disclosure. The method for an explosion suppression experiment may be implemented by an experimental device. The process 400 may include the following operations.

In 410, obtaining a filled experimental pipeline.

The experimental pipeline refers to a pipeline used to conduct the experiment, such as a rectangular pipeline with a width of 120 mm, a height of 120 mm, a length of 1000 mm, and a thickness of 20 mm. More descriptions regarding the experimental pipeline may be found in FIG. 5 and related descriptions hereinafter.

In some embodiments, second explosion suppression components may be assembled with a first explosion suppression component through a method for filling an explosion suppression component, and the assembled explosion suppression component may be placed within a pipeline body of the experimental pipeline to obtain the filled experimental pipeline.

More descriptions regarding the pipeline body, the first explosion suppression component, the second explosion suppression components, and the method for filling an explosion suppression component may be found in FIGS. 1-3 and related descriptions thereof. In some embodiments, when a plurality of experiments are conducted, counts of the second explosion suppression components and/or positions of the second explosion suppression components may be different in the filled experimental pipelines corresponding to the plurality of experiments.

In 420, discharging gas from the experimental pipeline through a gas pump.

In some embodiments, through the gas pump, the processor may pump original gas out of the experimental pipeline using an air exhaust manner. In some embodiments, the gas pump may pump gas (e.g., methane) into the experimental pipeline to replace the original air within the experimental pipeline.

In 430, configuring target gas into the experimental pipeline through a gas cylinder and a flow control device and performing a stewing operation on the target gas based on a stewing time.

In some embodiments, the gas cylinder may be connected to the experimental pipeline through the flow control device, and the processor may control the gas flow from the gas cylinder into the experimental pipeline through the flow control device. More descriptions regarding the gas cylinder and the flow control device may be found in related descriptions in FIG. 5 hereinafter.

The target gas refers to gas required for an experiment and stored in the gas cylinder. For example, the target gas may be methane, a methane mixture, etc. In some embodiments, the target gas may be methane with a concentration of 9.5%.

In some embodiments, the processor may control the gas pump to pump air into the experimental pipeline to replace original gas in the experimental pipeline. After the air replacement is complete, the processor may control the gas pump to turn off and the flow control device to turn on to allow the gas (e.g., methane) in the gas cylinder to flow into the experimental pipeline to mix with the air in the experimental pipeline, thereby configuring the target gas.

When a predetermined volume of the target gas is pumped into the experimental pipeline, the processor may control the flow control device to turn off and keep the experimental pipeline stationary to perform the stewing operation on the target gas.

The stewing time refers to a duration that the target gas needs the stewing operation. It should be understood that the stewing operation is performed on the target gas, which is conducive to making the target gas uniformly distributed and avoiding the uneven distribution of the target gas that interferes with the experimental data.

In some embodiments, the stewing time may be determined in a plurality of ways. For example, the stewing time may be obtained based on a table lookup, experience, or historical experimental data.

In some embodiments, the stewing time may be determined based on a target count of second explosion suppression components in the experimental pipeline and positions of the second explosion suppression components.

It should be understood that the count and positions of the second explosion suppression components may affect a gas diffusion rate. The greater the count of the second explosion suppression components is, the slower the gas may diffuse. The denser the distribution of the positions of the second explosion suppression components is, the slower the gas may diffuse.

In some embodiments, the processor may determine the stewing time based on the target count of the second explosion suppression components in the experimental pipeline and the positions of the second explosion suppression components in a plurality of ways. For example, the greater the target count is, and the denser the distribution of positions of the second explosion suppression components is, the longer the processor may set the stewing time. As another example, the processor may construct a second predetermined table according to a historical count of the second explosion suppression components, historical positions of the second explosion suppression components, and stewing times corresponding to the second explosion suppression components. The processor may determine the stewing time by querying the second predetermined table based on a target count of the second explosion suppression components and positions of the second explosion suppression components in a current experimental pipeline.

In some embodiments, the experimental device may determine the stewing time based on a reliability of an experimental result.

The reliability of the experimental result refers to a reliability degree of the explosion experimental result. In some embodiments, the reliability of the experimental result may be obtained in a plurality of ways. For example, the processor may determine the reliability by obtaining information input by a user.

In some embodiments, the processor may determine the reliability based on difference values of experimental results of a plurality of repeated experiments. For example, the processor may calculate a difference value of at least two experimental results and compare the difference value with a difference threshold. If the difference value is greater than the difference threshold, the reliability may be determined based on a count of times the difference value of the experimental result exceeds the difference threshold and a total count of experiments. Merely by way of example, the reliability may be determined as 1 minus a ratio of the count of times the difference value of the experimental result exceeding the difference threshold to the total count of experiments. The reliability of the experimental result may be determined by calculating based on a discretization degree of the at least two experimental results. The difference threshold may be predetermined based on experience or needs.

In some embodiments, the reliability of the experimental result may be negatively correlated with the stewing time. The lower the reliability of the experimental result is, the longer the stewing time may be set to prevent the stewing time from being too short and prevent the gas from being not evenly mixed or distributed, affecting the experimental results.

In some embodiments, the processor may determine a ratio of a standard stewing time to the reliability as the stewing time. The standard stewing time refers to a predetermined stewing time, and the standard stewing time may be predetermined based on experience or needs. In some embodiments, a maximum limit of the stewing time may be preset to avoid the problem of excessive stewing time due to low reliability.

In some embodiments of the present disclosure, the stewing time is accurately determined, and the gas is uniformly distributed in the experimental pipeline, which avoids spending too much time waiting for the gas to diffuse uniformly and is conducive to improving experimental efficiency.

In 440, controlling an ignition device to ignite through a synchronous controller, in response to a determination that an explosion occurs in the experimental pipeline, obtaining combustion information in the experimental pipeline through a camera device, and obtaining pressure data in the experimental pipeline through a sensing device.

Figure 15:
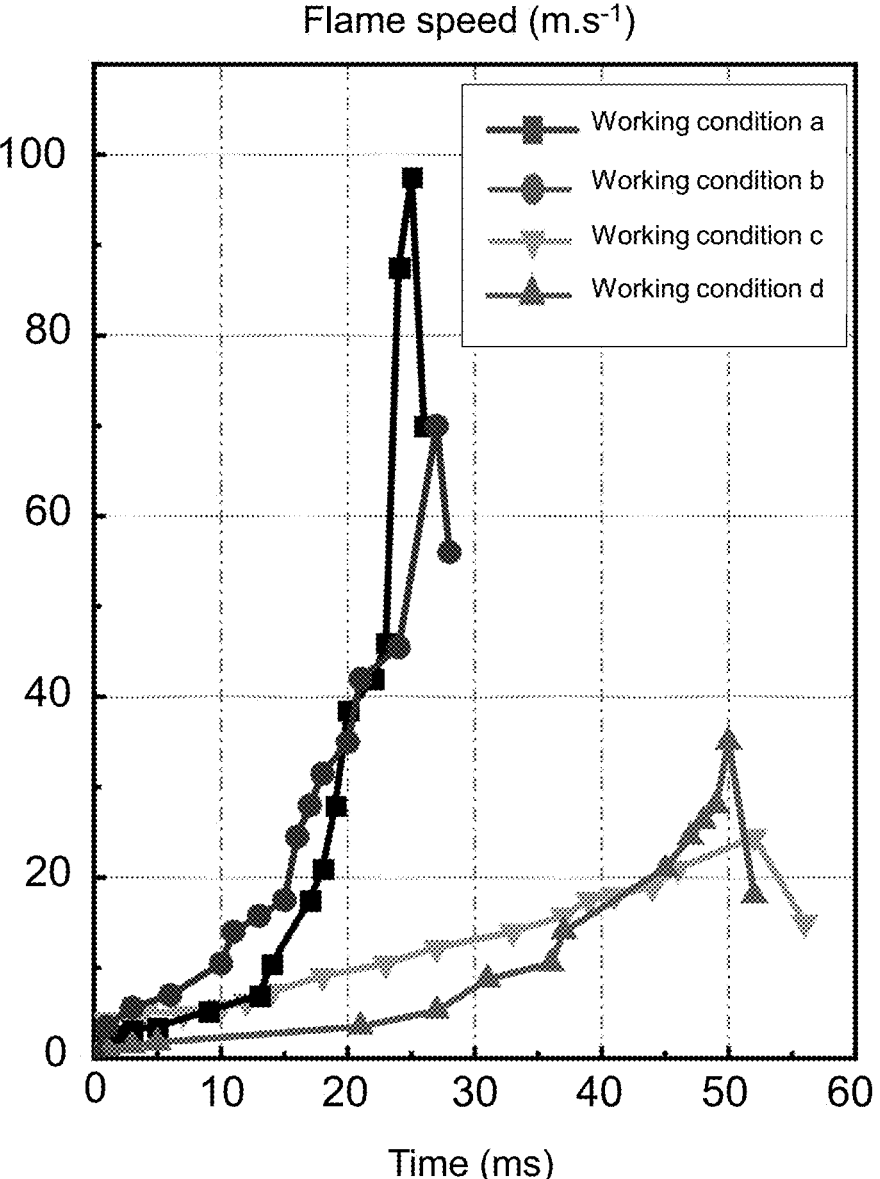
FIG. 15 is a comparative graph illustrating flame speeds in an experiment according to some embodiments of the present disclosure.

The combustion information refers to information related to combustion in the experimental pipeline. The combustion information may include a flame speed, whether the target gas is combusting, a combustion time, a combustion temperature, etc. In some embodiments, the processor may obtain the combustion information through the camera device. For example, as shown in FIG. 15, the processor may control the camera device to turn on when the ignition device is ignited, capture an image of a phenomenon in the experimental pipeline in real time, and obtain the combustion information based on the captured images, videos, etc., through an image processing model.

Figure 14:
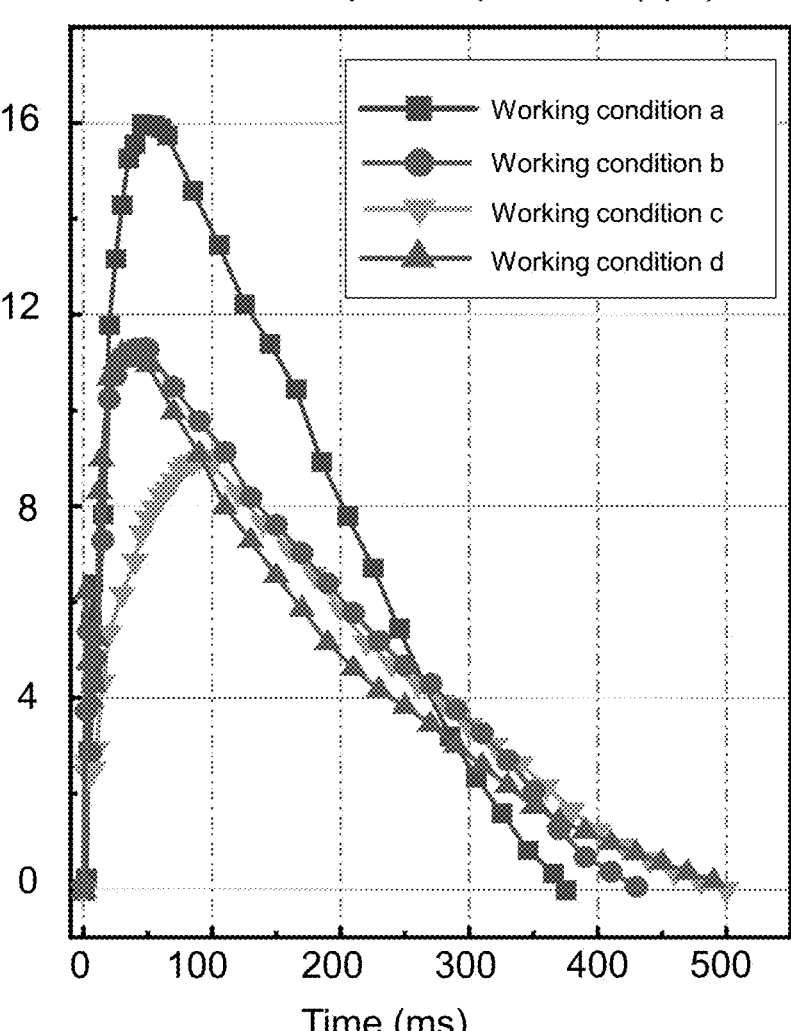
FIG. 14 is a comparative graph illustrating pressure change curves according to some embodiments of the present disclosure.

The pressure data refers to data related to a pressure in the experimental pipeline, such as a pressure exerted by an explosion impact on an inner wall of the experimental pipeline, etc. In some embodiments, the processor may obtain the pressure data through the sensing device, as shown in FIG. 14. More descriptions regarding the sensing device may be found in related descriptions in FIG. 5 hereinafter.

In some embodiments, the processor may determine the pipeline body of the experimental pipeline of a corresponding size and a corresponding count of second explosion suppression components based on sample pipeline information and a sample candidate count of sample pipelines and obtain the filled experimental pipeline by assembling the second explosion suppression components, a first explosion suppression component, and the experimental pipeline based on the method for filling an explosion suppression component. The processor may discharge the gas from the experimental pipeline through the gas pump, configure the target gas into the experimental pipeline through the gas cylinder and the flow control device, and perform the stewing operation on the target gas based on the stewing time. The processor may control the ignition device to ignite the ignition device through the synchronous controller. In response to a determination that the explosion occurs in the experimental pipeline, the processor may obtain sample pressure data in the experimental pipeline through the sensing device, and determine a maximum explosion pressure as a first label based on the sample pressure data. More descriptions regarding the sample pipeline, the sample pipeline information, the sample candidate count, the first label, etc. may be found in FIG. 3 and related descriptions thereof.

In some embodiments of the present disclosure, the accuracy of the experimental data may be improved by determining the stewing time and ensuring that the gas diffuses evenly. The combustion information and the pressure data may be automatically obtained using the experimental device, which may improve the experimental efficiency.

Figure 5:
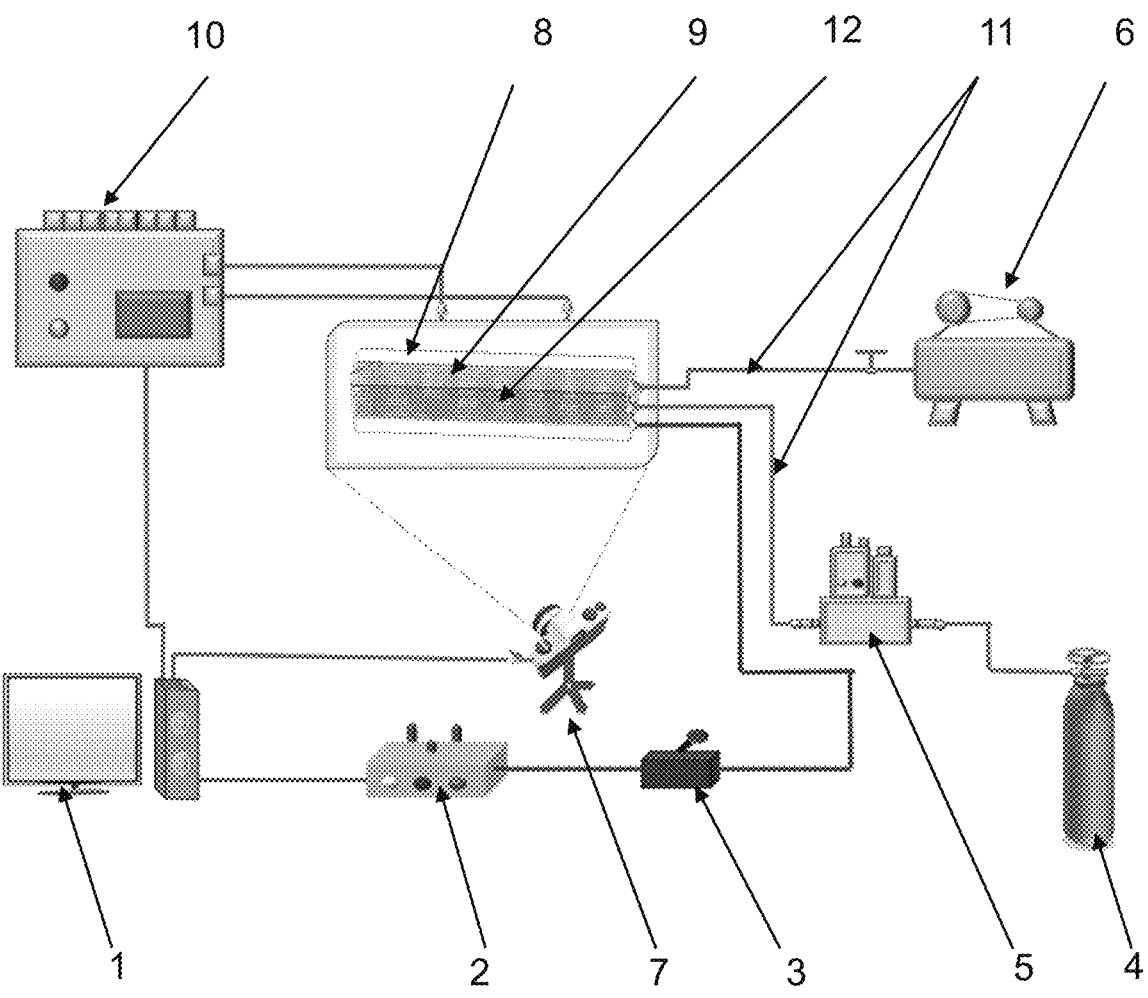
FIG. 5 is a schematic diagram illustrating an exemplary structure of an experimental device according to some embodiments of the present disclosure.

FIG. 5 is a schematic diagram illustrating an exemplary structure of an experimental device according to some embodiments of the present disclosure. As shown in FIG. 5, the experimental device includes an experimental pipeline 8, a gas cylinder 4, a gas pump 6, a flow control device 5, an ignition device 3, a synchronous controller 2, a sensing device 10, a camera device 7, and a processor 1.

The experimental pipeline 8 refers to a pipeline used to conduct an experiment. In some embodiments, the experimental pipeline 8 may include at least a portion of a pipeline body, a first explosion suppression component, at least one second explosion suppression component, etc. More descriptions regarding the first explosion suppression component and the second explosion suppression components may be found in FIG. 1 and related descriptions thereof.

In some embodiments, the experimental pipeline 8 may be connected to the gas cylinder 4 through the flow control device 5. In some embodiments, the experimental pipeline 8 may be connected to an output end of the gas pump 6. In some embodiments, the experimental pipeline 8 may be connected to the ignition device 3.

In some embodiments, the experimental pipeline 8 may also include an explosion vent. The explosion vent refers to an opening that allows an explosion impact to leave the experimental pipeline 8. In some embodiments, the explosion vent may be provided at an end of the experimental pipeline 8 away from the gas cylinder 4.

The gas cylinder 4 refers to a cylinder structure for storing gas. In some embodiments, the gas cylinder 4 may be used to store gas (i.e., the target gas) required for the experiment. In some embodiments, a gas pressure in the gas cylinder 4 may be greater than an outside atmospheric pressure. In some embodiments, the gas in the gas cylinder 4 may enter the experimental pipeline 8 through the flow control device 5.

The gas pump 6 may be used to pump air out of the experimental pipeline 8 to prevent air in the experimental pipeline 8 from affecting the accuracy of experimental data.

The flow control device 5 refers to a device capable of controlling a fluid flow. For example, the flow control device 5 may be a gas flow controller, etc. In some embodiments, the experimental pipeline 8 may be connected to the gas cylinder 4 through the flow control device 5, and the flow control device 5 may control an amount of gas flow from the gas cylinder 4 into the experimental pipeline 8.

The ignition device 3 refers to a structure capable of igniting. For example, the ignition device 3 may be a spark plug, etc. In some embodiments, the ignition device 3 may be connected to the experimental pipeline 8 to ignite the target gas in the experimental pipeline 8.

The sensing device 10 refers to a structure that may be used to detect data. For example, the sensing device 10 may include a pressure sensor, a temperature sensor, a flow rate sensor, or the like, or any combination thereof. In some embodiments, the sensing device 10 may be arranged within the experimental pipeline 8. In some embodiments, a plurality of sensing devices 10 may be arranged within the experimental pipeline 8, and the plurality of sensing devices 10 may be arranged at an interval.

The synchronous controller 2 may be configured to control at least two other structures to work synchronously. For example, the synchronous controller 2 may be configured to control the ignition device 3 to work simultaneously with the sensing device 10. For example, when controlling the ignition device 3 to ignite, the synchronous controller 2 may control the sensing device 10 to collect data simultaneously.

The camera device 7 refers to a device capable of collecting image data. For example, the camera device 7 may include a camera, a high-speed camera, etc.

The processor may be configured to collect, store, analyze, process data, etc., and may generate a control instruction based on a result of data processing, issue the control instruction to a corresponding structure, and control the corresponding structure to perform an action corresponding to the control instruction. The processor may also include one or more predetermined programs.

In some embodiments, the processor 1 may be connected to the sensing device 10 and/or the camera device 7 by means of a wired connection and/or a wireless connection to control the sensing device 10 and/or the camera device 7 to perform data collection.

In some embodiments, one or more of the gas pump 6, the flow control device 5, the ignition device 3, the synchronous controller 2, the sensing device 10, the camera device 7, etc. may be electrically connected to the processor, respectively. The processor may issue the control instructions to control the gas pump 6, the flow control device 5, the ignition device 3, the synchronous controller 2, the sensing device 10, the camera device 7, etc., respectively, to perform corresponding actions. For example, the processor may control the gas pump 6 to turn on or off. The processor may control the flow control device 5 to turn on or off.

In some embodiments, the experimental device may also include a ventilation pipeline 11 for gas communication between components of the experimental device. For example, the experimental pipeline 8 may be connected to the flow control device 5 through the ventilation pipeline 11, the flow control device 5 may be connected to the gas cylinder 4 through the ventilation pipeline 11, and the experimental pipeline 8 may be connected to the output end of the gas pump 6 through the ventilation pipeline 11.

In some embodiments of the present disclosure, an automation degree of the experiment is improved using the experimental device for the experiment, and the normal conduct of the experiment is ensured.

Figure 6:
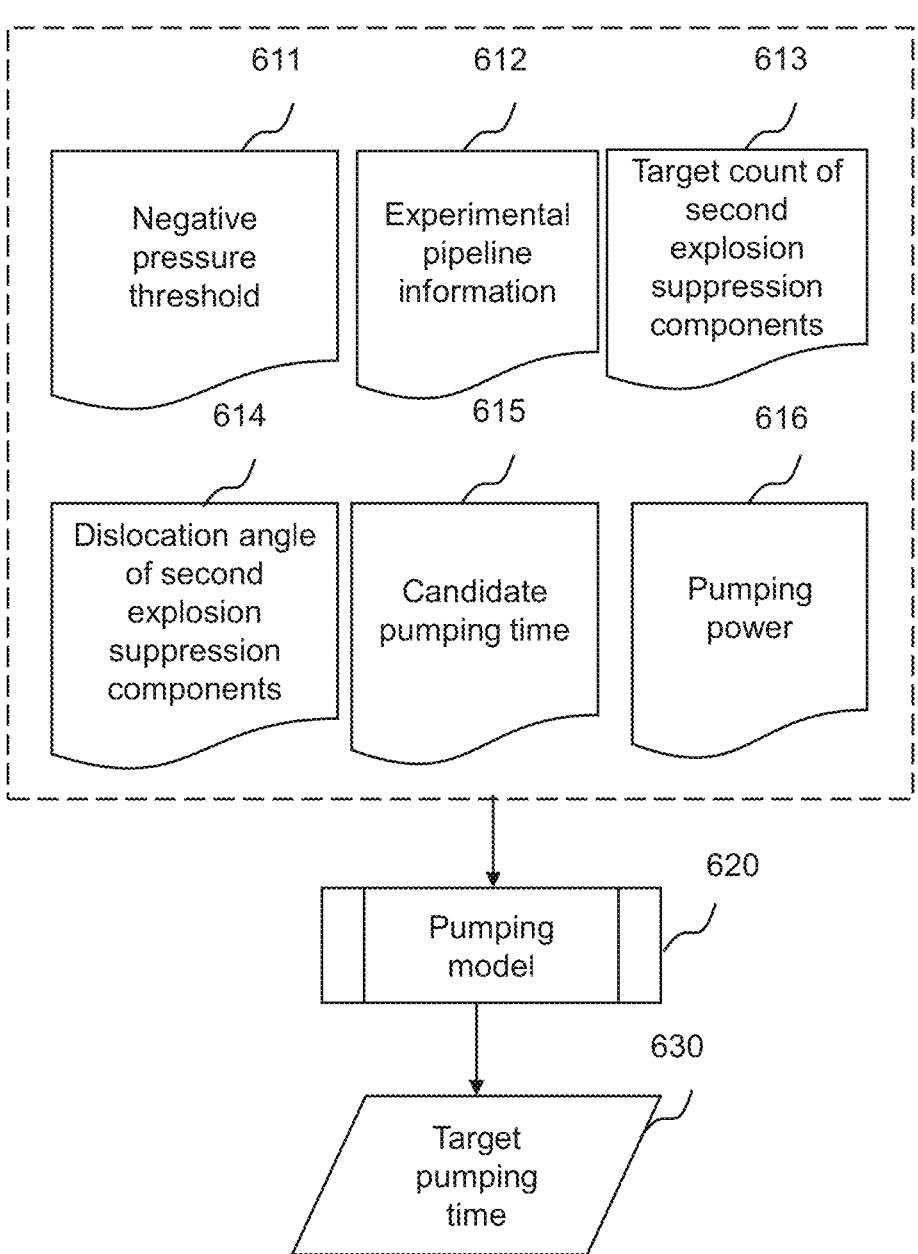
FIG. 6 is a schematic diagram illustrating an exemplary pumping model according to some embodiments of the present disclosure.

FIG. 6 is a schematic diagram illustrating an exemplary pumping model according to some embodiments of the present disclosure.

In some embodiments, a sensing device may include a gas pressure sensor configured to monitor gas pressure information in an experimental pipeline. The gas pressure information refers to data information related to a gas pressure. For example, the gas pressure information may include a magnitude of the gas pressure, a change in the gas pressure of target gas, etc.

In some embodiments, the flow control device may also include a negative pressure device. The flow control device refers to a device capable of creating a negative pressure in a pipeline. For example, the flow control device may include a negative pressure fan, etc. In some embodiments, the negative pressure device may be configured to assist the flow control device in discharging air from the experimental pipeline.

In some embodiments, the processor may perform a pumping operation on the experimental pipeline through the negative pressure device and determine a pumping time based on a count of explosion suppression components and positions of the explosion suppression components in the experimental pipeline.

The pumping operation refers to an operation of pumping air in the experimental pipeline using the negative pressure device. In some embodiments, the processor may obtain the gas pressure information in the experimental pipeline based on the gas pressure sensor. In response to a determination that the gas pressure in the gas pressure information reaching a negative pressure threshold, the processor may control the negative pressure device to stop pumping air. The negative pressure threshold refers to a threshold smaller than a standard atmospheric pressure. For example, the negative pressure threshold may be 80% of the standard atmospheric pressure. That is, after the target gas is configured into the experimental pipeline and a stewing operation is performed on the target gas for a certain period of time, the experimental pipeline is filled with a mixture of 80% air and 20% target gas. The negative pressure threshold may be predetermined based on experience or needs.

The pumping time refers to a time required for the gas pressure in the experimental pipeline to reach the negative pressure threshold.

In some embodiments, the processor may determine the pumping time based on the count of explosion suppression components and the positions of the explosion suppression components in the experimental pipeline in a plurality of ways. For example, the processor may construct a third predetermined table based on a historical count of explosion suppression components, historical positions of the explosion suppression components in a historical experimental pipeline, and pumping times corresponding to the explosion suppression components. The processor may determine a current pumping time by querying the third predetermined table based on a current count of explosion suppression components and current positions of the explosion suppression components in the experimental pipeline.

In some embodiments, the processor may also determine a target pumping time based on the negative pressure threshold, experimental pipeline information, a target count of second explosion suppression components, positions of the second explosion suppression components, a candidate pumping time, and a pumping power. The processor may also obtain an actual pumping time at the pumping power. In response to a determination that the actual pumping time reaches the negative pressure threshold, the target pumping time satisfies a preset condition, and a pipeline leakage occurs, the processor may also determine a reliability degree. More descriptions regarding the negative pressure threshold, the pipeline information, the target count of second explosion suppression components, and the positions of the second explosion suppression components may be found in related descriptions in FIGS. 1-5.

The candidate pumping time refers to an alternative pumping time. In some embodiments, the processor may obtain the candidate pumping time by obtaining information input by a user, historical information, etc.

The pumping power refers to a power of the negative pressure device when pumping. In some embodiments, the pumping power may be predetermined based on experience or needs.

The actual pumping time refers to a pumping time actually required for the actual negative pressure to reach the negative pressure threshold. In some embodiments, the processor may obtain the actual pumping time based on the gas pressure sensor, the negative pressure device, and a timing device.

The target pumping time refers to a predicted pumping time.

In some embodiments, the processor may determine the target pumping time 630 based on the negative pressure threshold 611, the experimental pipeline information 612, the target count 613 of second explosion suppression components, a dislocation angle 614 of the second explosion suppression components, the candidate pumping time 615, and the pumping power 616 through the pumping model 620.

The pumping model 620 refers to a model for determining the target pumping time. In some embodiments, the pumping model 620 may be a machine learning model, such as a neural network (NN) model, etc. In some embodiments, an input of the pumping model 620 may include the experimental pipeline information 612, the target count 613 of second explosion suppression components, the dislocation angle 614 of the second explosion suppression components, the candidate pumping time 615, the pumping power 616, and the negative pressure threshold 611.

In some embodiments, an output of the pumping model 620 may be the target pumping time 630.

In some embodiments, the pumping model 620 may be obtained by training a plurality of second training samples with second labels. The second training sample(s) may include pipeline information of a sample experimental pipeline, a target count of sample second explosion suppression components, a dislocation angle of the sample second explosion suppression components, a sample candidate pumping time, a sample pumping power, and a sample negative pressure threshold. The second label(s) may include an actual pumping time corresponding to the sample experimental pipeline.

In some embodiments, in the pumping model, under a condition of different target counts of second explosion suppression components, different dislocation angles of second explosion suppression components, different pipeline information, and different pumping powers, an average value of the actual pumping times required for the pressure data obtained by corresponding sensing devices to reach the negative pressure threshold may be designated as the second label(s) in historical experimental data. The experiment may include a plurality of repeated experiments with same parameters.

In some embodiments, when the actual pumping time is close to the target pumping time (e.g., when a ratio of a difference between a current gas pressure and the negative pressure threshold to the negative pressure threshold is smaller than 20%, etc.), monitoring frequency of the sensing device of monitoring the pressure data in the experimental pipeline may be appropriately increased (e.g., increased by 20% to 50%, etc., and the monitoring frequency may be preset based on experience or needs), or the pumping power may be appropriately reduced (e.g., reduced by 20% to 50%, etc.) to avoid excessive pumping, fluctuations in the pressure data in the experimental pipeline, and affecting the experimental results. Therefore, the problem of untimely monitoring of the pressure data that leads to errors may also be avoided.

The preset condition may include a difference between the actual pumping time and the target pumping time exceeding a time difference threshold. The time difference threshold may be preset based on experience or needs.

It should be understood that when the actual pumping time reaches the negative pressure threshold and the target pumping time satisfies the preset condition, the experimental pipeline may have a problem such as a pipeline leakage, which affects the reliability degree of the experimental results. More descriptions regarding the reliability degree may be found in FIG. 4 and related descriptions thereof.

In some embodiments, when the actual pumping time and the target pumping time satisfy the preset condition and the difference between the actual pumping time and the target pumping time is greater than the preset time threshold, the processor may set the reliability degree to be 0. At this time, a stewing time remains unchanged. More descriptions regarding the stewing time may be found in FIG. 4 and related descriptions thereof.

In some embodiments of the present disclosure, when the target counts and the dislocation angles of second explosion suppression components in the experimental pipeline are different, an actual volume of gas in the experimental pipeline may be affected, and pumping efficiency of the negative pressure fan may also be affected. Data such as the experimental pipeline information, the target count and the dislocation angle of second explosion suppression components, etc. may be analyzed using a well-trained pumping model, so that a more reasonable pumping time may be quickly determined, thereby effectively ensuring reliability of the experimental result.

In some embodiments of the present disclosure, the experimental pipeline may be pumped through the negative pressure device to simulate an environment of a natural gas explosion, which may evaluate the pumping time required for the pressure data in the pipeline to reach the negative pressure threshold better, be more realistic, and more effectively avoid accidents.

One or more embodiments of the present disclosure provide a natural gas pipeline including a pipeline body. A barrier and explosion suppression material may be provided within the pipeline body. The barrier and explosion suppression material may include a barrier and explosion suppression body and a barrier and explosion-proof sheet set. The barrier and explosion suppression body may be arranged on an inner peripheral wall of the pipeline body along an axial direction of the pipeline body to form an explosion suppression channel. A plurality of barrier and explosion-proof sheet sets may be provided, which may be arranged at an interval along an axial direction of the explosion suppression channel. The barrier and explosion-proof sheet set may include at least one barrier and explosion-proof sheet, which may be arranged in the explosion suppression channel along a radial direction of the explosion suppression channel. The barrier and explosion suppression body and the barrier and explosion-proof sheet are made of an aluminum alloy foil, which has a honeycomb porous hexagonal structure.

Preferably, in some embodiments, the barrier and explosion-proof sheet set may include three barrier and explosion-proof sheets, and the three barrier and explosion-proof sheets may be arranged at an equal interval.

Preferably, in some embodiments, the porous hexagonal structures of two adjacent barrier and explosion-proof sheets may be provided in a mutual dislocation arrangement.

Preferably, in some embodiments, the barrier and explosion-proof sheet may be formed by stacking and cutting seam expansion.

Preferably, in some embodiments, a plurality of barrier and explosion-proof sheet sets may be arranged at an equal interval along the axial direction of the explosion suppression channel.

One or more embodiments of the present disclosure provide a method for filling a barrier and explosion suppression material, which may be applicable to the natural gas pipeline as described above.

The method may include forming the explosion suppression channel by performing cutting and winding on the aluminum alloy foil of the honeycomb porous hexagonal structure and forming the barrier and explosion-proof sheet set by performing stacking and cutting seam expansion on the aluminum alloy foil of the honeycomb porous hexagonal structure.

The method may also include arranging the barrier explosion-proof sheet set in the explosion suppression channel and forming the barrier and explosion suppression material by arranging the barrier explosion-proof sheet set at an interval along the radial direction of the explosion suppression channel.

The method may further include placing the barrier and explosion suppression material within the pipeline body.

One or more embodiments of the present disclosure provide a method for an explosion suppression experiment. An experimental device required for the method for an explosion suppression experiment may include an experimental pipeline for placing a natural gas pipeline, a methane gas cylinder, a gas pump, a flow controller, a pulse igniter, a synchronous controller, a pressure sensor, a high-speed camera, and a computer. The experimental pipeline may be connected to the methane gas cylinder through the flow controller. The experimental pipeline may be connected to an output end of the gas pump. The pressure sensor may be configured to detect a pressure in the experimental pipeline. The high-speed camera may be configured to observe an experimental situation of the experimental pipeline. The pulse igniter may be connected to the experimental pipeline. The computer may be connected to the synchronous controller and the pressure sensor, respectively. The synchronous controller may be connected to the pulse igniter. The experimental pipeline may be provided with an explosion vent. The method for an explosion suppression experiment may include the following operations.

In S1, filling the experimental pipeline using the method for filling a barrier and explosion suppression material described above.

In S2, turning on the gas pump to discharge the remaining gas in the experimental pipeline through an air exhaust manner.

In S3, opening the methane gas cylinder, configuring methane gas into the experimental pipeline through the flow controller, and performing a stewing operation on the methane gas for 3 min-5 min.

In S4, turning on the synchronous controller and controlling the pulse igniter to ignite, in response to an explosion and fire in the experimental pipeline, capturing the explosion and flame combustion situation in the experimental pipeline by the high-speed camera, and recording pressure data of the experimental pipeline by the pressure sensor when the explosion occurs.

In S5, shutting down the experimental device and cleaning the experimental pipeline after the explosion.

Embodiment 1

As shown in FIG. 1 and FIGS. 8-13, a natural gas pipeline may include a pipeline body. The pipeline body may be provided with a barrier and explosion suppression material (which may also be referred to as an explosion suppression component). The barrier and explosion suppression material may include a barrier and explosion suppression body 9 (which may also be referred to as a first explosion suppression component) and a barrier and explosion-proof sheet set 12 (which may also be referred to as second explosion suppression components). The barrier and explosion suppression body 9 may be arranged on an inner peripheral wall of the pipeline body along an axial direction of the pipeline body to form an explosion suppression channel. In some embodiments, the barrier and explosion suppression material may include at least one barrier and explosion-proof sheet set 12. The at least one barrier and explosion-proof sheet set 12 may be arranged at an equal interval along an axial direction of the explosion suppression channel.

In the embodiment, the barrier and explosion-proof sheet set 12 may include one, two, three, or five barrier and explosion-proof sheets (which may also be referred to as second explosion suppression sub-components). The barrier and explosion-proof sheets may be arranged at an equal interval, and porous hexagonal structures of two adjacent barrier and explosion-proof sheets may be provided in a mutual dislocation arrangement. The barrier and explosion-proof sheets may be formed by stacking and cutting seam expansion (which may also be referred to as a second process), and the barrier and explosion-proof sheets may be arranged in the explosion suppression channel along a radial direction of the explosion suppression channel. In some embodiments, both the barrier and explosion suppression body 9 and the barrier and explosion-proof sheets may be made of an aluminum alloy foil (i.e., the foregoing explosion suppression material), which has a honeycomb porous hexagonal structure. In some embodiments, a side length of the aforementioned hexagonal structure may be 4 mm±0.5 mm, 5 mm±0.5 mm, 5.5 mm±0.5 mm, 6 mm±0.5 mm, 7 mm±0.5 mm, etc., and a specific size may be designed according to a pipeline size. It may be understood that the honeycomb porous hexagonal structure may resist the release of instantaneous energy at the moment of explosion, absorb the high temperature generated by the explosion, rapidly dissipate heat outward, and prevent the spread and expansion of the flame, thereby ensuring the safety of storage and transportation. Using the aluminum alloy foil may not only ensure material flexibility and good extensibility required in the process of cutting and expansion, but also ensure that the molded barrier and explosion suppression material has rigidity, high strength, high abrasion resistance, and high corrosion resistance, which may make it easy for the material to be filled in a rectangular pipeline, make it uneasily deformed during filling, and effectively suppress the explosion of gas such as methane. In some embodiments, the shape formed by cutting and stacking the aluminum alloy foil may include a cylinder, a sphere, a square, a rectangle, etc., and stacked and shaped barrier and explosion-proof sheets may be put into the barrier and explosion suppression body 9 of a same shape such as a rectangular or circular. In some embodiments, a dimension of the barrier and explosion suppression body 9 may match an inner wall of the pipeline body.

Embodiment 2

Embodiment 2 is a filling method of Embodiment 1, including a method for filling a barrier and explosion suppression material applicable to the natural gas pipeline as described above.

The method for filling a barrier and explosion suppression material may include forming the explosion suppression channel by performing cutting and winding on an aluminum alloy foil of a honeycomb porous hexagonal structure and forming the barrier and explosion-proof sheet set 12 by performing stacking and cutting seam expansion on the aluminum alloy foil of the honeycomb porous hexagonal structure.

The method for filling a barrier and explosion suppression material may also include arranging the barrier and explosion-proof sheet set 12 in the explosion suppression channel and forming the barrier and explosion suppression material by arranging the barrier explosion-proof sheet set 12 at an interval along a radial direction of the explosion suppression channel.

The method for filling the barrier and explosion suppression material may further include placing the barrier and explosion suppression material within a pipeline body.

Embodiment 3

Embodiment 3 is an explosion suppression experiment to be conducted on the natural gas pipeline that is filled and completed in Embodiment 2, specifically, a method for an explosion suppression experiment shown in FIG. 4 and FIG. 5. An experimental device required for the method may include an experimental pipeline for placing the natural gas pipeline 8, a methane gas cylinder 4 (which may also be referred to as a gas cylinder), a gas pump 6, a flow controller 5 (which may also be referred to as a flow control device), a pulse igniter 3 (which may also be referred to as an ignition device), a synchronous controller 2, a pressure sensor 10 (which may also be referred to as a sensing device), a high-speed camera 7 (which may also be referred to as a camera device) and a computer 1 (which may also be referred to as a processor). In some embodiments, the experimental pipeline 8 may be connected to the flow controller 5 through a ventilation pipeline 11, the flow controller 5 may be connected to the methane gas cylinder 4 through the ventilation pipeline 11, and the experimental pipeline 8 may be connected to an output end of the gas pump 6 through the ventilation pipeline 11. In some embodiments, the pressure sensor 10 may be configured to detect a pressure in the experimental pipeline 8, and the high-speed camera 7 may be configured to observe an experimental situation of the experimental pipeline 8. In some embodiments, the computer 1 may be connected to the synchronous controller 2 and the pressure sensor 10, respectively, the synchronous controller 2 may be connected to the pulse igniter 3, the pulse igniter 3 may be connected to the experimental pipeline 8, and the experimental pipeline 8 may be provided with an explosion vent. In some embodiments, the method for the explosion suppression experiment may include the following operations.

In S1, filling the experimental pipeline 8 using the method for filling a barrier and explosion suppression material described above.

In S2, turning on the gas pump 6 to discharge the gas in the experimental pipeline 8 through an air exhaust manner.

In S3, opening the methane gas cylinder 4, configuring methane gas into the experimental pipeline 8 through the flow controller 5, and performing a stewing operation on the methane gas for 3 min-5 min.

In S4, turning on the synchronous controller 2 and controlling the pulse igniter 3 to ignite, in response to an explosion and fire in the experimental pipeline 8, capturing the explosion and flame combustion situation in the experimental pipeline 8 by the high-speed camera 7, and recording pressure data of the experimental pipeline by the pressure sensor 10 when the explosion occurs.

S5, shutting down the experimental device and cleaning the experimental pipeline 8 after the explosion.

In some embodiments, a shape of the pipeline body may be rectangular and cylindrical. When the pipeline body is a rectangular pipeline, it may have a size of a length of 120 mm, a width of 120 mm, a height of 1000 mm, and a thickness of 20 mm. In some embodiments, a methane concentration of 9.5% may be used when the explosion suppression experiment is conducted. In some embodiments, the pipeline body may be filled with the barrier and explosion suppression body 9, and then each barrier and explosion-proof sheet set 12 in the middle are provided with one, three, or five barrier and explosion-proof sheets at an equal interval to constitute a plurality of experimental sets, and an explosion suppression experiment is conducted for each experimental set.

It may be understood that one, two, three, or five barrier and explosion-proof sheets of a honeycomb porous hexagonal structure may be placed at the equal interval in each barrier and explosion-proof sheet set 12 in the middle, respectively, which may constitute four experimental working conditions for the experiments. In some embodiments, a set of explosion suppression experiments may be conducted based on each of the above four working conditions and compared with relevant experimental data without adding an explosion suppression material. By analyzing a maximum explosion pressure and a maximum flame speed under different working conditions, a working condition with a best explosion suppression effect may be obtained. The specific experimental conditions are as follows.

| Working condition | Amount of methane | Experimental subject | |
|---|---|---|---|
| a | 9.50% | Methane only | |
| b | 9.50% | two barrier and explosion-proof sheets were arranged in each barrier and explosion-proof sheet set 12 at an equal interval | Barrier and explosion suppression material was |

-continued

| Working condition | Amount of methane | Experimental subject | |
|---|---|---|---|
| c | 9.50% | three barrier and explosion-proof sheets were arranged in each barrier and explosion-proof sheet set 12 at an equal interval | put into the pipeline |
| d | 9.50% | five barrier and explosion-proof sheets were arranged in each barrier and explosion-proof sheet set 12 at an equal interval | |

Experiment 1: a certain concentration (9.50%) of methane gas was configured in the experimental pipeline 8 according to working condition a, the high-speed camera 7 was turned on after 3 min-5 min, a shooting position was adjusted, and the high-speed camera 7 was configured to shoot an explosion and flame combustion situation in the pipeline; the synchronous controller 2 was turned on, the pulse igniter 3 was controlled to ignite, and the pressure sensor 10 was turned on simultaneously to record the pressure data; and an experimental device was turned off and cleaned up after the explosion.

Experiment 2: according to working condition b, two barrier and explosion-proof sheets were arranged in each barrier and explosion-proof sheet set 12 at an equal interval, a barrier and explosion suppression material was put into the experimental pipeline 8, after the gas pump 6 was turned on to discharge the remaining gas in the pipeline through an air exhaust manner, another side of the experimental pipeline 8 was sealed with a PVC film as an explosion vent, the flow controller 5 was used to introduce a certain volume fraction (9.50%) of methane gas required by the working condition b, a stewing operation was performed on the methane gas for 3 min-5 min to make the methane gas disperse uniformly, the high-speed camera 7 was turned on, the shoot position was adjusted, and the high-speed camera 7 was configured to shoot the flame and explosion combustion situation in the experimental pipeline 8; the synchronous controller 2 was turned on, the pulse Igniter 3 was controlled to ignite, and the pressure sensor 10 was turned on simultaneously to record the pressure data; and the experimental device turned off and the experimental pipeline 8 was cleaned up after the explosion.

Experiment 3: according to a working condition c, three barrier and explosion-proof sheets were arranged in each barrier and explosion-proof sheet set 12 at an equal interval, the barrier and explosion suppression material was put into the experimental pipeline 8, after the gas pump 6 was turned on to discharge the remaining gas in the pipeline through an air exhaust manner, another side of the experimental pipeline 8 was sealed with a PVC film as an explosion vent, the flow controller 5 was used to introduce a certain volume fraction (9.50%) of methane gas required by the working condition c, and a stewing operation was performed on the methane gas for 3 min-5 min to make the methane gas disperse uniformly, the high-speed camera 7 was turned on, the shoot position was adjusted, and the high-speed camera 7 was configured to shoot the flame and explosion combustion situation in the experimental pipeline 8; the synchronous controller 2 was turned on, the pulse Igniter 3 was controlled to ignite, and the pressure sensor 10 was turned on simultaneously to record the pressure data; and the experimental device turned off and the experimental pipeline 8 was cleaned up after the explosion.

Experiment 4: according to a working condition d, five barrier and explosion-proof sheets were arranged in each barrier and explosion-proof sheet set 12 at an equal interval, the barrier and explosion suppression material was put into the experimental pipeline 8, after the gas pump 6 was turned on to discharge the remaining gas in the pipeline through an air exhaust manner, another side of the experimental pipeline 8 was sealed with a PVC film as an explosion vent, the flow controller 5 was used to introduce a certain volume fraction (9.50%) of methane gas required by the working condition d, and a stewing operation was performed on the methane gas for 3 min-5 min to make the methane gas disperse uniformly, the high-speed camera 7 was turned on, the shoot position was adjusted, and the high-speed camera 7 was configured to shoot the flame and explosion combustion situation within the experimental pipeline 8; the synchronous controller 2 was turned on, the pulse Igniter 3 was controlled to ignite, and the pressure sensor 10 was turned on simultaneously to record the pressure data; and the experimental device turned off and the experimental pipeline 8 was cleaned up after the explosion.

As shown in Table 2 below, methane explosion suppression effects when the explosion suppression material is filled based on different filling methods were compared with a methane explosion suppression effect when the explosion suppression material is not filled, it is seen that a weakening effect of the explosion suppression material on methane explosion is more obvious. In the explosion suppression experiments, the maximum explosion pressure of methane was 11.304, 9.036, 11.203, respectively. If experimental results of experiment 1 to experiment 4 are compared, it is seen that compared with the experimental result of experiment 1 without adding the explosion suppression material, in the experimental results of experiment 2 to experiment 4, a maximum explosion pressure, a maximum flame speed decreased, a time reaching the maximum flame speed also correspondingly prolonged, which indicates that adding the barrier and explosion suppression material has a certain explosion suppression effect on methane explosion. Under the working condition c, the maximum explosion pressure decreased most obviously, the maximum flame speed decreased significantly, the time reaching the maximum flame speed was the longest, and a flame length was the longest when the maximum flame speed was reached. Therefore, the experiments show that as long as the barrier and explosion suppression material is added, there is a certain explosion suppression effect on the methane explosion. After the barrier and explosion suppression material was added around the experimental pipeline 8, there was a slightly obvious explosion-suppression effect. The explosion suppression effect was best when three barrier and explosion-proof sheets were placed at an equal interval in each barrier and explosion-proof sheet set 12 in the middle.

| Working condition | Maximum explosion pressure Pmax (KPa) | Time reaching Pmax t1 (ms) | Maximum flame speed Vmax (m · s−1) | Time reaching Vmax t2 (ms) | Flame length reaching Vmax L (m) |
|---|---|---|---|---|---|
| a | 15.977 | 60 | 97 | 24 | 0.471 |
| b | 11.304 | 48.2 | 68 | 26 | 0.482 |
| c | 9.036 | 97 | 23 | 52 | 0.498 |
| d | 11.203 | 48.3 | 35 | 49 | 0.475 |

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

These alterations, improvements, and modifications are intended to be suggested by this disclosure and are within the spirit and scope of the exemplary embodiments of this disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations, therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present disclosure) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for filling an explosion suppression component, wherein the method is implemented by a device for filling the explosion suppression component, and the method comprises:

forming a first explosion suppression component by performing a first process on an explosion suppression material;

forming at least one second explosion suppression component by performing a second process on the explosion suppression material, wherein the first explosion suppression component and the at least one second explosion suppression component include a porous hexagonal structure, the first process comprises cutting and winding, and the second process comprises stacking and cutting seam expansion;

determining a target count of the at least one second explosion suppression component, comprising:

obtaining pipeline information and a candidate count of the at least one second explosion suppression component;

determining, based on the pipeline information and the candidate count, a maximum explosion pressure through an explosion-proof model, the explosion-proof model being a machine learning model; and determining, based on the maximum explosion pressure and the candidate count, the target count;

assembling the at least one second explosion suppression component of the target count with the first explosion suppression component to form an explosion suppression component; and placing the explosion suppression component within a pipeline body of the natural gas pipeline.

2. The method of claim 1, wherein the assembling the at least one second explosion suppression component of the target count with the first explosion suppression component comprises:

determining a dislocation angle; and providing the at least one second explosion suppression component of the target count in a mutual dislocation arrangement, the dislocation angle between different second explosion suppression components is different.

3. The method of claim 1, wherein the device for filling the explosion suppression component comprises at least one processor and at least one storage, wherein the at least one storage is configured to store computer instructions;

the at least one processor is configured to execute at least a portion of the computer instructions to implement the method for filling an explosion suppression component in claim 1.

4. A method for an explosion suppression experiment, implemented through an experimental device, wherein the method comprises:

obtaining a filled experimental pipeline, which is transparent;

discharging gas from the experimental pipeline through a gas pump;

configuring target gas into the experimental pipeline through a gas cylinder and a flow control device, and performing a stewing operation on the target gas based on a stewing time, wherein the stewing time is determined based on a target count of at least one second explosion suppression component in the experimental pipeline and a position of the at least one second explosion suppression component; and controlling an ignition device to ignite through a synchronous controller, in response to a determination that an explosion occurs in the experimental pipeline, obtaining combustion information in the experimental pipeline through a camera device, and obtaining pressure data in the experimental pipeline through a sensing device.

5. The method of claim 4, wherein the experimental device comprises the experimental pipeline, the gas cylinder, the gas pump, the flow control device, the ignition device, the synchronous controller, the sensing device, the camera device, and a processor, wherein the experimental pipeline is connected to the gas cylinder through the flow control device, the experimental pipeline is connected to an output end of the gas pump, the experimental pipeline is connected to the ignition device, and the experimental pipeline is provided with an explosion vent;

the sensing device is configured to obtain the pressure data within the experimental pipeline;

the camera device is configured to obtain experimental information about the experimental pipeline;

the ignition device is configured to ignite and is connected to the experimental pipeline;

the processor is configured to control the ignition device to ignite through the synchronous controller, and obtain the pressure data in the experimental pipeline through the sensing device; and the processor is connected to the synchronous controller and the sensing device, respectively, and the synchronous controller is connected to the ignition device.

6. The method of claim 4, wherein the flow control device further comprises a negative pressure device, and the method further comprises:

performing a pumping operation on the experimental pipeline by the negative pressure device; and determining a pumping time based on a count of at least one explosion suppression component and a position of the at least one explosion suppression component in the experimental pipeline.

7. The method of claim 6, wherein the determining a pumping time comprises:

determining a target pumping time based on a negative pressure threshold, experimental pipeline information, a target count of at least one second explosion suppression component, a position of the at least one second explosion suppression component, a candidate pumping time, and a pumping power;

obtaining an actual pumping time at the pumping power;

in response to a determination that the actual pumping time reaches the negative pressure threshold and the target pumping time satisfies a preset condition, a determination that a pipeline leakage occurs, and determining a reliability degree.

* * * * *